(12) United States Patent
McKay et al.

(10) Patent No.: US 11,703,404 B2
(45) Date of Patent: Jul. 18, 2023

(54) DEVICE FOR AUTOMATED CROP ROOT SAMPLING

(71) Applicant: Colorado State University Research Foundation, Fort Collins, CO (US)

(72) Inventors: John Keith McKay, Fort Collins, CO (US); Caleb Andrew Alvarado, Fort Collins, CO (US); Guy R. Babbitt, Fort Collins, CO (US); Kyle Joseph Palmiscno, Loveland, CO (US); Christopher Wayne Turner, Windsor, CO (US); Bryce Conrad Whitehill, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 380 days.

(21) Appl. No.: 16/904,195

(22) Filed: Jun. 17, 2020

(65) Prior Publication Data

US 2020/0400518 A1 Dec. 24, 2020

Related U.S. Application Data

(60) Provisional application No. 62/862,449, filed on Jun. 17, 2019.

(51) Int. Cl.

| G01L 5/00 | (2006.01) |
|---|---|
| B25J 15/02 | (2006.01) |
| G01S 17/894 | (2020.01) |
| A01D 25/04 | (2006.01) |
| A01D 27/02 | (2006.01) |
| B25J 9/02 | (2006.01) |

(Continued)

(52) U.S. Cl.
CPC .......... *G01L 5/0033* (2013.01); *A01D 25/042* (2013.01); *A01D 27/02* (2013.01); *B25J 9/023* (2013.01); *B25J 13/085* (2013.01); *B25J 15/0033* (2013.01); *B25J 15/0253* (2013.01); *B25J 19/023* (2013.01); *G01S 17/894* (2020.01)

(58) Field of Classification Search
None
See application file for complete search history.

(56) References Cited

U.S. PATENT DOCUMENTS

| 4,714,196 A | 12/1987 | McEachern et al. | |
|---|---|---|---|
| 4,753,115 A * | 6/1988 | Moody | G01L 5/0033 73/862.01 |

(Continued)

FOREIGN PATENT DOCUMENTS

| CN | 203551167 | 4/2014 |
|---|---|---|
| CN | 104142980 | 11/2014 |

(Continued)

*Primary Examiner* — Daniel L Greene
(74) *Attorney, Agent, or Firm* — Meunier Carlin & Curfman LLC

(57) ABSTRACT

This invention comprises a device for measuring root pulling force (RPF) in a plant. The RPF device comprises a plant grasping mechanism, as well as a force measurement sensor. In certain embodiments, the device is automatic, so that the "hand of man" is not required to exert force on the plant while the root pulling force of the plant is being measured. Also disclosed is a root pulling force motion mechanism, which brings the RPF device into proximity of a plant to be measured. Further disclosed is a method for measuring root pulling force of a plant.

10 Claims, 21 Drawing Sheets

(51) Int. Cl.
  *B25J 15/00* (2006.01)
  *B25J 19/02* (2006.01)
  *B25J 13/08* (2006.01)

(56) References Cited

U.S. PATENT DOCUMENTS

| | | | |
|---|---|---|---|
| 5,054,831 A * | 10/1991 | Ting | A01G 9/086 |
| | | | 111/104 |
| 7,277,178 B2 | 10/2007 | Shpantzer et al. | |
| 7,388,668 B2 | 6/2008 | Potma et al. | |
| 8,613,234 B1 | 12/2013 | Harrell | |
| 9,646,036 B2 | 5/2017 | Merriman et al. | |
| 9,678,999 B1 | 6/2017 | Gibas et al. | |
| 2007/0013908 A1 | 1/2007 | Lee et al. | |
| 2007/0289299 A1* | 12/2007 | Chao | G01L 5/0033 |
| | | | 60/487 |
| 2009/0058849 A1 | 3/2009 | Ingersoll et al. | |
| 2009/0083005 A1 | 3/2009 | Allen | |
| 2010/0208252 A1 | 8/2010 | Marks et al. | |
| 2011/0083518 A1* | 4/2011 | Barreiro | A01G 7/00 |
| | | | 73/862.59 |
| 2011/0288895 A1 | 11/2011 | Perez et al. | |
| 2013/0325903 A1 | 12/2013 | Rohlf et al. | |
| 2014/0269416 A1 | 9/2014 | Bowler et al. | |
| 2017/0105346 A1* | 4/2017 | Davidson | A01D 46/30 |
| 2018/0153103 A1* | 6/2018 | Bravo Trinidad | A01D 46/30 |
| 2021/0337734 A1* | 11/2021 | Jeanty | B65G 47/914 |
| 2022/0078972 A1* | 3/2022 | Faulring | A01D 46/28 |

FOREIGN PATENT DOCUMENTS

| | | | | |
|---|---|---|---|---|
| CN | 104655488 | | 5/2015 | |
| CN | 103557979 | | 7/2015 | |
| CN | 105043811 | | 11/2015 | |
| CN | 204789027 | | 11/2015 | |
| CN | 104729925 | | 6/2017 | |
| CN | 107271642 | | 10/2017 | |
| CN | 110050566 B | * | 1/2022 | A01D 25/02 |
| EP | 2799840 | | 11/2014 | |
| WO | 2003081388 | | 10/2003 | |
| WO | 2013003924 | | 1/2013 | |
| WO | 2014178199 | | 11/2014 | |
| WO | 2015191690 | | 12/2015 | |

* cited by examiner

DEVICE FOR AUTOMATED CROP ROOT SAMPLING

PRIORITY STATEMENT

This application claims the benefit of U.S. Provisional Patent Application No. 62/862,449, filed on Jun. 17, 2019, entitled "Automated Crop Root Sampling Method for Field Based Research Plots."

GOVERNMENT SUPPORT CLAUSE

This invention was made with government support under grant DE-AR0000826 awarded by Department of Energy. The government has certain rights in the invention.

BACKGROUND OF THE INVENTION

Producing a sustainable food, fiber, and bioenergy supply for 9.7 billion people by 2050 is perhaps the greatest environmental, scientific, and social challenge of the 21st century. Meeting this challenge requires a substantial increase in crop productivity in the face of increasing climate variability and depleted water resources and soil degradation. At the same time, new approaches are needed to regenerate soil carbon (C), enabling greater moisture and nutrient retention, and reducing greenhouse gas (GHG; i.e., $CO_2$, $CH_4$ and $N_2O$) emissions. The key to meeting both of these challenges is to improve root structure and to enhance the ability of plants to access water and nutrients, and increase the efficiency with which plant-fixed C is stabilized as soil organic matter (SOM).

Controlling root structure and function in the context of crop productivity is the last frontier in understanding of plant growth regulation. While the power of genetics and molecular biology have revealed many important insights on root development in model plants under defined growth conditions, progress in applying these findings to crop plants in the field have been exceedingly limited.

Until the present invention, root pulling was performed manually using a handheld dynamometer and a rope. The current method for collecting the root pulling force (RPF) phenotype in crops is as follows: a plant is visually selected; the stalk is cut 6-12 inches above the soil surface; the rope is looped twice around the stalk; the dynamometer is hooked onto the rope; the plant is pulled until it releases from the ground; the peak force is recorded on a data sheet.

The current method to collect this phenotype is arduous and lengthy, but the data yields valuable information about root architecture and strength. What is needed in the art are tools to revolutionize the ability to study root structure and function in the field at the requisite scale. Disclosed herein is technology to remove the bottleneck to apply genetic and genomic tools for the discovery and deployment of root traits that control plant growth and soil bio-geochemistry. These breakthroughs will profoundly impact plant productivity for food, fiber, and fuel.

BRIEF SUMMARY OF THE INVENTION

Disclosed herein is a root pulling force (RPF) device, the device comprising a plant grasping mechanism and a force measurement sensor, wherein said device is automated. Said device can further comprise at least one actuator, wherein said actuator is capable of moving the plant grasping mechanism into position with respect to a plant. Said device can also further comprise a plant location sensor. Said plant grasping mechanism can comprise two parallel plates, wherein said parallel plates are capable of moving toward each other. Said parallel plates can be joined by linkage, wherein said linkage is capable of driving the parallel plates in opposite directions from one another, therefore creating a space between them. The two parallel plates can be attached to the actuator, which can be driven by an electric motor. The actuator can be a ball screw actuator. One or more vertical rods can be attached to each of the parallel plates, wherein said vertical rods are oriented parallel to a plant stalk. Said vertical rods can be on opposite parallel plates are offset from each other, such that a rod on one plate aligns with a space on an opposite plate. The vertical rods can be smaller in diameter than an average mature plant stalk. Two or more vertical rods can present on each parallel plate, and can be arranged in a linear pattern with a space between them approximately equal to that of the rod diameter. The vertical rods can have machined or formed threads or other horizontal striations that come to sharp points on an outer surface of the vertical rods. The vertical rods further comprise a chamfer at both distal and proximal ends of the vertical rods.

In one embodiment, a blade can be attached to the plant grasping mechanism of the RPF device, wherein said blade is capable of cutting a plant stalk. The plant grasping mechanism can comprise crescent shaped plates, wherein the crescent shaped plates have a concave side, wherein said concave side faces outward, so that the concave side is in contact with a plant stalk. The plant grasping mechanism can comprise a rope, wherein said rope is capable of wrapping around the plant or a stalk of the plant. In one embodiment, three or more ropes are arranged vertically with a proximal end of each rope attached to a vertical static member and a distal end of each rope attached to an actuated vertical bar. The plant grasping mechanism comprises a cam and plate. Said cam can be rotatable with respect to the plate. The cam and plate can be textured.

The RPF device can comprise a programmable computer system. In the RPF device, the force measurement sensor can comprise a three axis load cell, which can be capable of measuring force along three independent axes. The force measurement sensor can also comprise a compliant member, wherein said compliant member is affixed with at least one load cell.

Also disclosed is that the RPF device can comprise a support frame in an inverted U shape, wherein each side of the U shape comprises a leg. In one embodiment, the frame can comprise a landing plate. Each leg can be capable of contacting ground on either side of a plant. The support frame can be attached to a vehicle, such as a high clearance tractor.

The plant location sensor of the RPF device can comprise a camera. The plant location sensor can comprise a visible light bar and a receiver. Alternatively, the plant location sensor can comprise a Light Detection and Ranging (LIDAR) component. In another alternative embodiment, the sensor can comprise an ultrasonic sensor component.

In the RPF device disclosed herein, said plant grasping mechanism can comprise a pressure plate capable of sensing when contact is made with an object. Said pressure plate can be mounted on distal end of said plant grasping mechanism. A spring-loaded mechanical flag can be attached to the plant grasping mechanism.

Further disclosed herein is a root pulling force (RPF) motion mechanism, wherein said RPF motion mechanism is associated with a plant grasping mechanism of an RPF device. Said mechanism can follow a fixed or variable path of motion. The RPF motion mechanism can comprise a set of three orthogonal linear actuators. The orthogonal linear actuators can comprise a slide and a ball screw. The ball screw can powered by an electric motor. In one embodiment, all three actuators can be attached in series. A first of the three actuators can be capable of moving the plant grasping mechanism perpendicular to a crop row. A second of the three actuators can be capable of providing vertical motion to the plant grasping mechanism. The second of the three actuators can be capable of providing pulling force to the grasping mechanism. The second actuator can be located beneath the first actuator with respect to the RPF device. Said force can be applied at a fixed velocity. A third of the three actuators can be parallel to a crop row and can be capable of aligning the plant grasping mechanism to a plant. The third actuator can be located beneath the first actuator with respect to the RPF device. The plant grasping mechanism can be attached to the third actuator. At least one of the three actuators is outfitted with an encoder, wherein said encoder is capable of tracking a position of the slide along its length of travel. In one embodiment, two or three of the actuators can be outfitted with an encoder.

The RPF motion mechanism can comprise at least one sensor. For example, the RPF motion mechanism can comprise 2, 3, 4, or more sensors. The RPF motion mechanism can comprise a hydraulic or pneumatic cylinder. The RPF motion mechanism can comprise at least one actuator and a motor, wherein said motor is capable of rotating said grasping mechanism.

Also disclosed herein is a method for measuring root pulling force in a plant with roots, wherein said plant is growing in growing media, the method comprising: contacting the plant with a Root Pulling Force (RPF) device, wherein said device comprises a plant grasping mechanism and a force measurement sensor; bringing the plant grasping mechanism into contact with a plant; automatically exerting upward pull on the plant via the plant grasping mechanism; and measuring the root pulling force of the plant accordingly. The plant can be corn. The plant grasping mechanism can be brought into contact with the plant automatically. The RPF device can be mounted to a vehicle, such as a high clearance tractor. The force measurement sensor can be connected to a computer to record root pulling force. The growing media can be soil. The RPF device can be mounted to a frame, wherein said frame is capable of straddling a row of crops. The frame can be attached to tracks. The stalk diameter can be measured simultaneously with the root pulling force. In one embodiment, the plant may not be removed from growing media while upward pull is being exerted.

The details of one or more implementations are set forth in the accompanying drawings and the detailed description herein. Other features, objects and advantages of various implementations of the invention will be apparent from this description, the drawings, and claims.

BRIEF DESCRIPTION OF THE DRAWINGS

Reference will now be made to the accompanying drawings, which are not necessarily drawn to scale.

DETAILED DESCRIPTION

The automated Root Pulling Force (RPF) device disclosed herein can be used to assist in field-based root phenotyping. It is designed to collect data on the amount of force that is required to pull a plant (including all or part of its root system) from the earth. It has been shown that root pulling force can be correlated to different physical attributes or phenotypes of the plant's root system architecture.

In order to collect RPF data, the device disclosed herein is designed with a plant grasping mechanism that can grasp a portion of the plant that is above ground (e.g. the stalk) throughout the pulling process. The grasping mechanism moves automatically into position around a plant prior to grasping the plant stalk. Once in position, the mechanism grasps the plant and pulls vertically, extracting the plant from the soil. Throughout the pulling sequence the force exerted by the device on the plant is measured. After the pulling sequence is complete, the grasping mechanism of the device releases the plant and is retracted to a platform that can travel in the area between rows of plants, allowing the device to be easily moved through a planted field from plot to plot.

Figure 1:
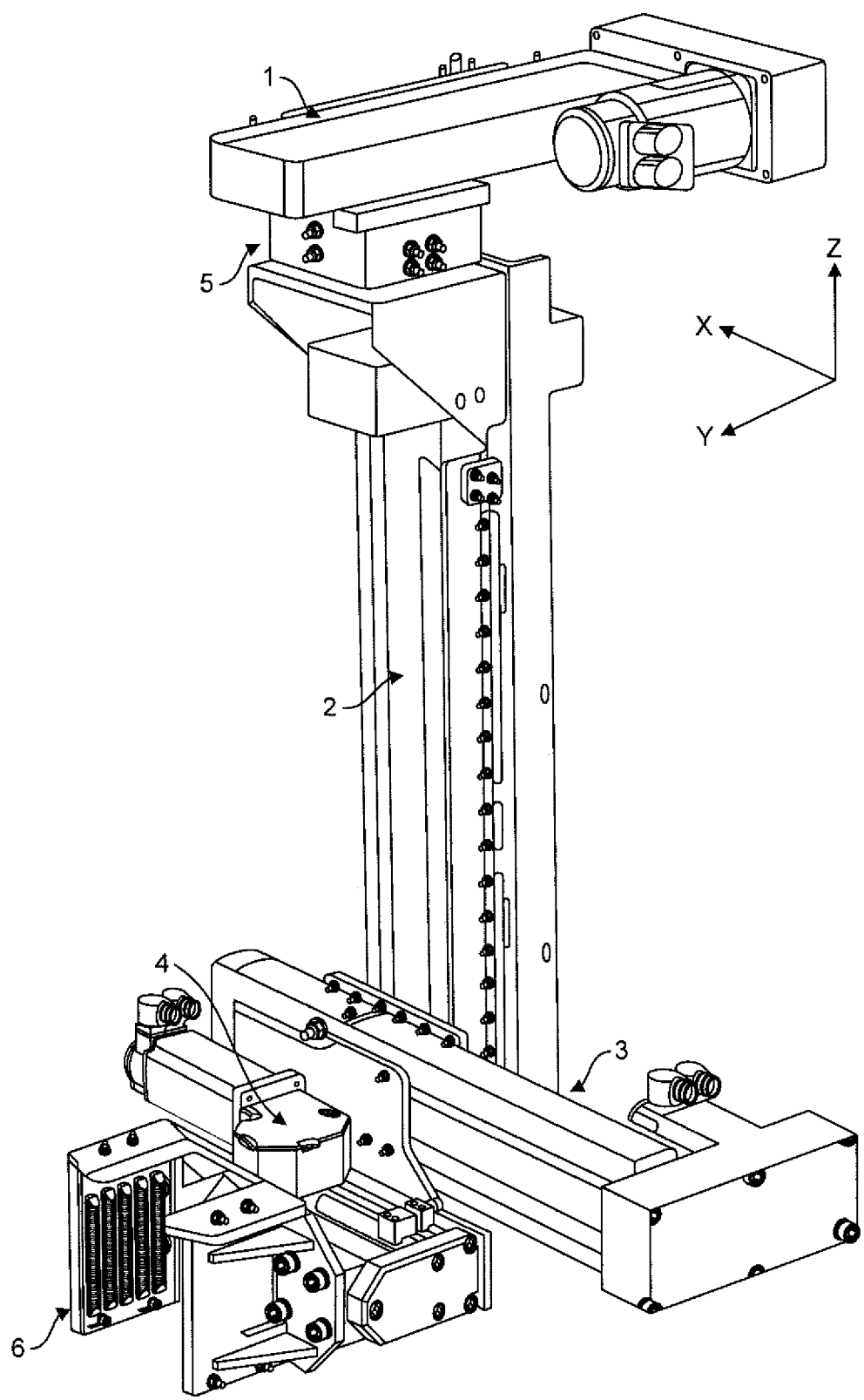
FIG. 1 is a sketch of the Root Pulling Force (RPF) device.
Figure 2:
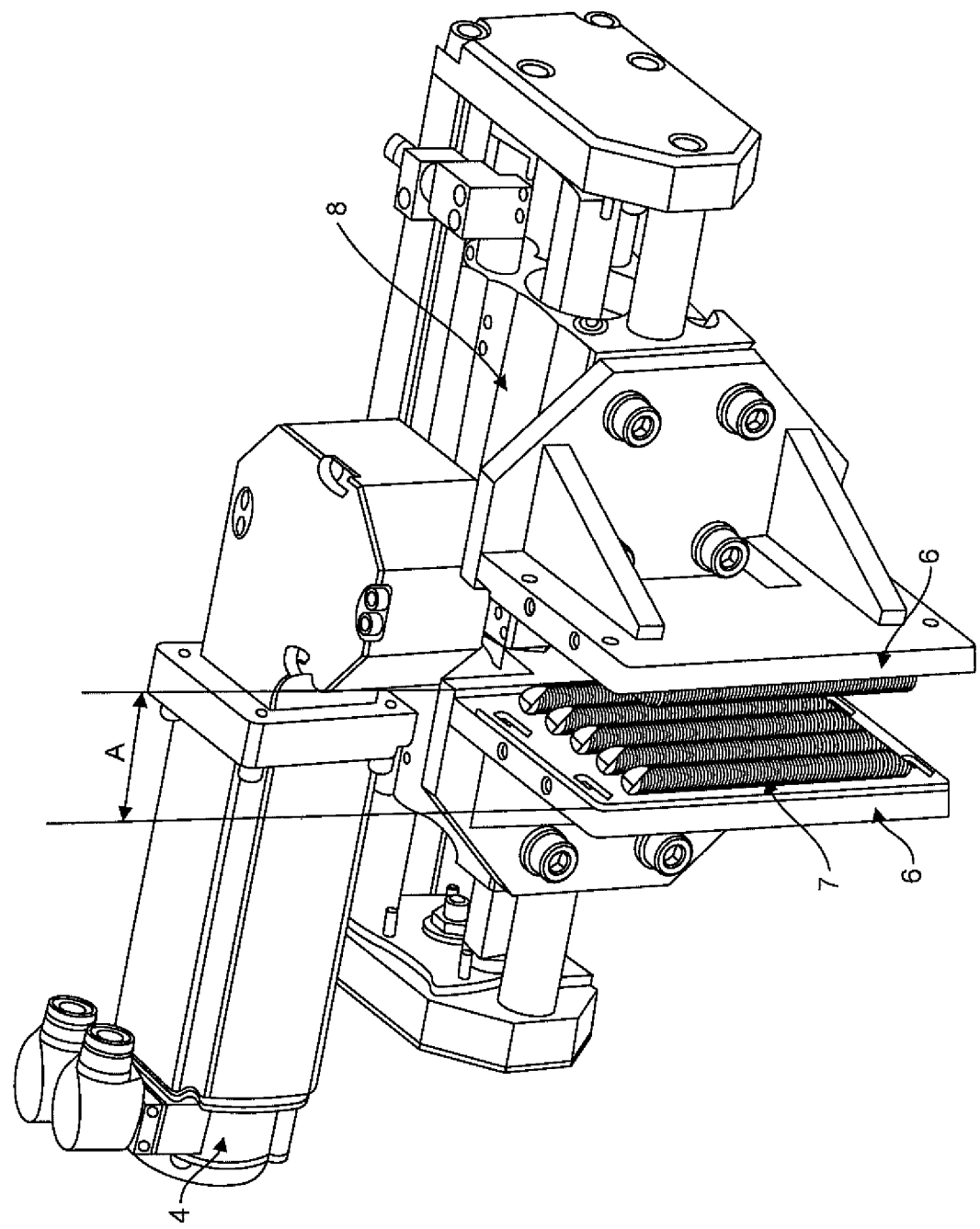
FIG. 2 shows the grasping mechanism of the RPF device.
Figure 3:
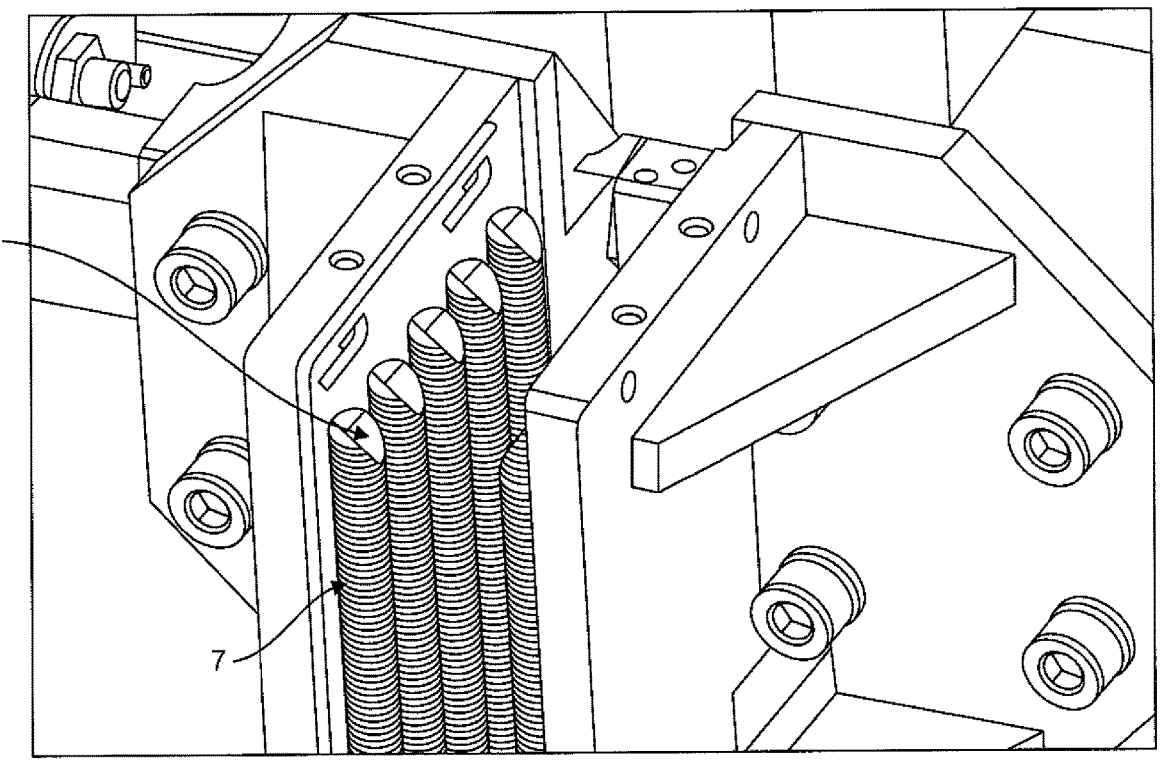
FIG. 3 shows detail of the horizontal grasper plate of the RPF device.
Figure 4:
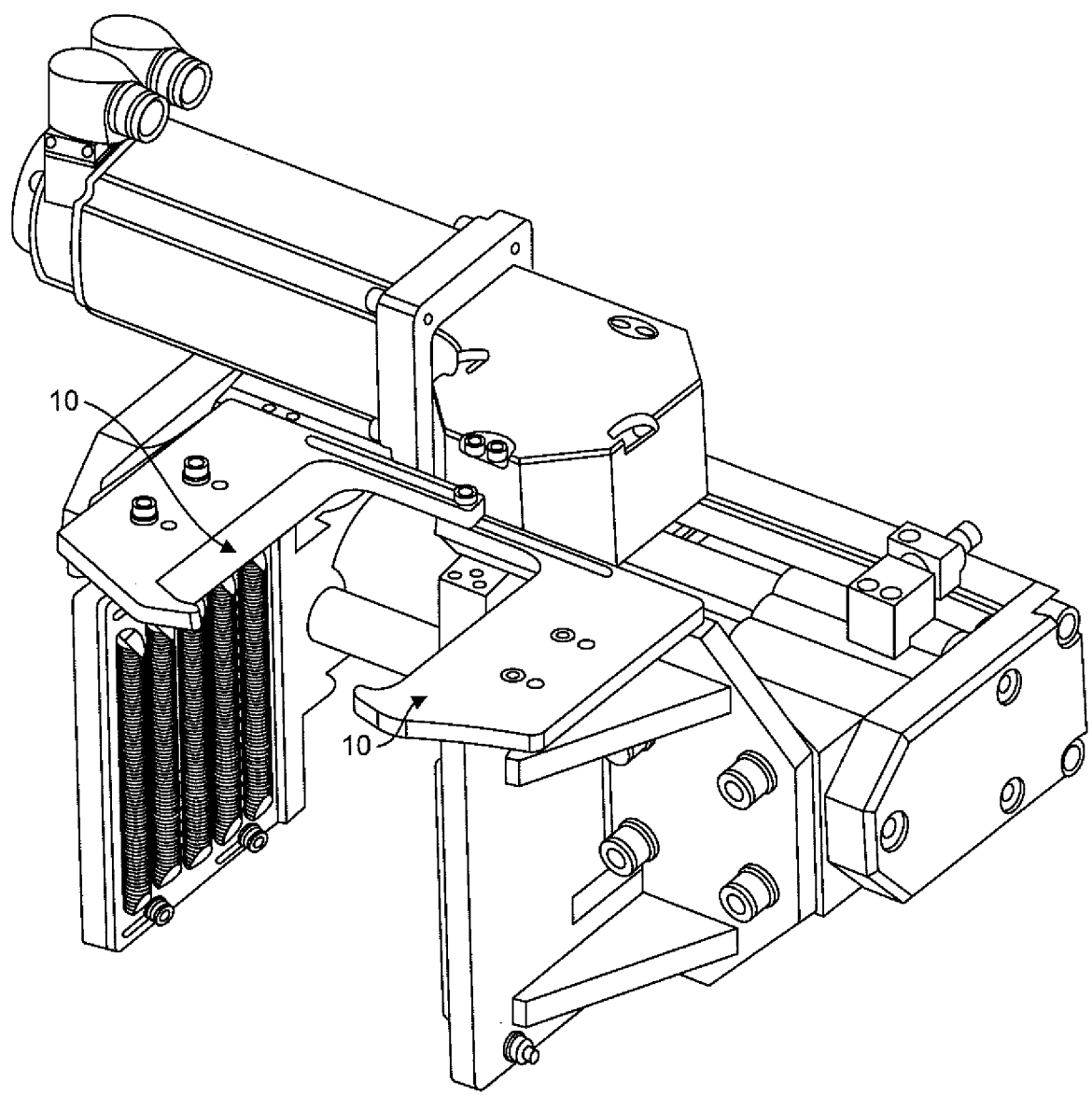
FIG. 4 shows the grasping mechanism of the RPF device with cutting blades.

Turning to FIG. 1, the RPF device consists of plant grasping mechanism 4 and 6, actuators 1, 2, 3 that move the grasper into position with respect to the plant, a plant location sensor, and force measurement sensor 5. Actuators 1, 2, and 3 allow y, z and x movement respectively as defined by FIG. 1. The entire mechanism is limited in size to allow it to fit between two adjacent rows of planted crops. This allows the mechanism to move easily through the field and periodically take sample measurements from subsequent plots.

Plant Grasping Mechanism

The plant grasping mechanism (4, 6), or grasper, is responsible for gripping the plant stalk throughout the pulling sequence. The magnitude of the allowable gripping force has an upper limit driven by the structural integrity of the plant being pulled. Excessive gripping force can cause damage to the plant that will subsequently cause it to break during the pull sequence. However, this mechanism must provide enough gripping force to hold the plant without allowing the grasper to slip on the plant while an upward pulling force is applied. In short, the interface between the plant and the grasping mechanism must be designed to reduce slippage, while limiting force concentrations that could damage the plant to the point of breakage. The preferred embodiment of the plant grasping mechanism is two parallel plates, 6, that move toward each other. These plates are positioned on either side of a plant stalk and are brought toward each other to grip onto the plant. The plates are sized significantly larger than the diameter of a full-grown plant stalk (4-6 times as long) which reduces how precisely the grasper must be located with respect to the plant as it travels perpendicular to the row of corn (in the y-direction). For example, if the stock plate diameter is up to 1.5", the plate width could be 4, 5, 6, 7, 8, 9, or 10 inches, for example. The spacing between the plates is derived from the spacing between planted seeds. The measurement between plates (measured normal to the plate face—dimension "A") is designed such that it is less than the centerline spacing of the plants minus the maximum diameter of the plant stalk. This guarantees that as the grasper moves into the row of plants, there will only be one plant stalk between the plates.

The two parallel plates, 6, are attached to ball screw actuator 8 and driven by electric motor 4. The electric motor is fully enclosed to prevent dirt and water incursion. The ball screw actuator is similarly enclosed except for the dynamic portion of the drive which contains a wiper seal. The actuator is also designed with a purge port that can be used to maintain positive pressure within the actuator. Again, this is to reduce the amount of dirt and moisture ingress into the chamber. The ball screw actuator 8 is used to move parallel plates towards and away from each other.

The preferred embodiment moves plates 6 at an equal rate towards a median plane between them. The torque required to move the plates towards each other and to grasp the plant can be correlated to the current draw of the electric motor. The grasping force can be controlled by limiting the allowable current supplied to motor 4. Controlling the grasping force allows the mechanism to be tuned to supply adequate force to prevent slippage while minimizing structural damage and breakage of the plant during pulling. The magnitude of the gripping force will likely vary based on the age of the plant with younger plants requiring less gripping force to prevent slippage. Limits of gripping force can be applied manually by the user or can be automatically applied (via lookup tables, empirical information, learning algorithms, time of year, sensed plant stalk diameter, etc.). Regarding the gripping force, this can be a relative value that can be gauged on a scale, for example, from 0-100 units. The amount measured per plant pull can then be compared to a standard reference, or to similar values. The reference level can be determined by an average based on that particular crop, particular field, or particular stage of growth, for example. One of skill in the art will be able to assess how a relative pull force value for comparison can be generated.

Attached to parallel plates 6 are vertical rods 7 that are oriented parallel to the plant stalk. These rods are smaller in diameter than the plant stalk and are arranged in a linear pattern on the plate with a space between them equal to that of the rod diameter. Each rod is relatively long compared to the plant diameter (4-6 times) which allows the gripper to contact a large surface area of the stalk. Increasing the contact area on the plant (thus reducing grip pressure) reduces the likelihood that the grasping mechanism will create stress concentrations capable of breaking the plant. The position of vertical rods 7 on opposite plates are offset such that a rod on one plate aligns with a space in the opposite plate. This arrangement dictates that a plant stalk is always in contact with three rods during pulling.

Each rod 7 can have machined or formed threads or other horizontal striations that come to sharp points on the outer surface (the side that faces the plant during gripping) to help grip the plant stalk. The threads or striations can be shallow enough that they do not penetrate significantly into the outer surface of the plant stalk. Each rod 7 also has a large lead in angle or chamfer 9 machined or formed into it located on both the proximal and distal ends. This chamfer 9 helps to reduce the force concentrations applied to the plant stalk that exist at the rod ends. The shallow threads and chamfer allow the rods to grip into the plant slightly without causing appreciable structural damage to the plant.

The preferred embodiment of the parallel gripper plates has been designed specifically for pulling plants with well-developed stalks. This grasping mechanism has also been designed such that these plates can be removed, and alternate gripper plates can be installed that are optimized for use with plants of different phenotypes.

The ability to apply attachments has been designed into the grasping mechanism as well. To illustrate, for easier plant manipulation, it can be desirable to remove the upper portion of the plant and just retain the lower stalk and the root system. To accomplish this, blade pair 10 can be attached to the top of each gripper plate 7. Regardless of plant or plant stalk diameter, the blades are positioned such that they overlap prior to when the plant has been sufficiently gripped between gripper plates 7. As the plates move towards each other, the blades initially make contact with the plant and cut off the upper portion through a shearing action, leaving the lower stalk intact. As the plates continue to travel toward each other, they then grasp the plant stalk in preparation for root pulling.

Alternate embodiments of the plant grasping mechanism (4, 6) can be implemented on the RPF device to achieve the same results. Some of these alternate designs range from simple changes to the parallel grasping plates (6) to a more passive cam-style design for gripping the plants. One skilled in the art can recognize that examples of these alternate embodiments are not limited to the ones outlined below.

Softer Material Parallel Plates

Figure 5:
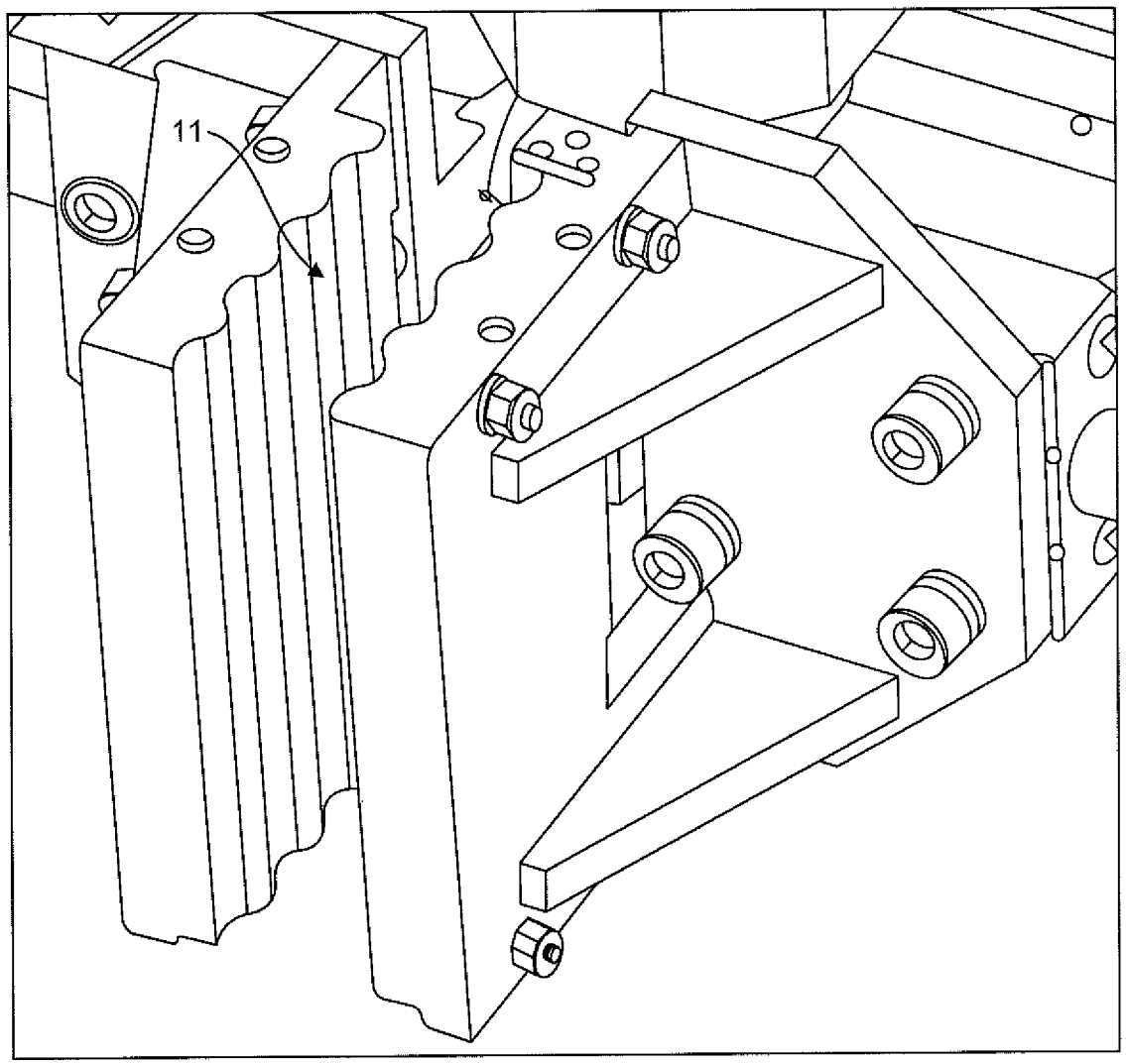
FIG. 5 shows sinusoidal rubber gripper plates.

An alternate embodiment of the grasping mechanism replaces the parallel plates/vertical rod (6, 7) combination with alternate designs. Plants that require less vertical force to pull them from the ground may require a plate that is more compliant. The metal threaded rods could be replaced with a rubber/polymer interface that allows for some compression. The pattern of this plate can vary from a flat, rubber-coated plate to a molded rubber with a sinusoidal wave pattern 11 that interfaces with an offset wave on the opposite plate (FIG. 5). This plate configuration will interact with the plant being pulled in a similar manner as the threaded rods, but the compliant material will result in a more even distribution of pressure on the plant stalk reducing potential damage on the gripped portion of the plants.

Crescent Shaped Plates

Figure 6A:
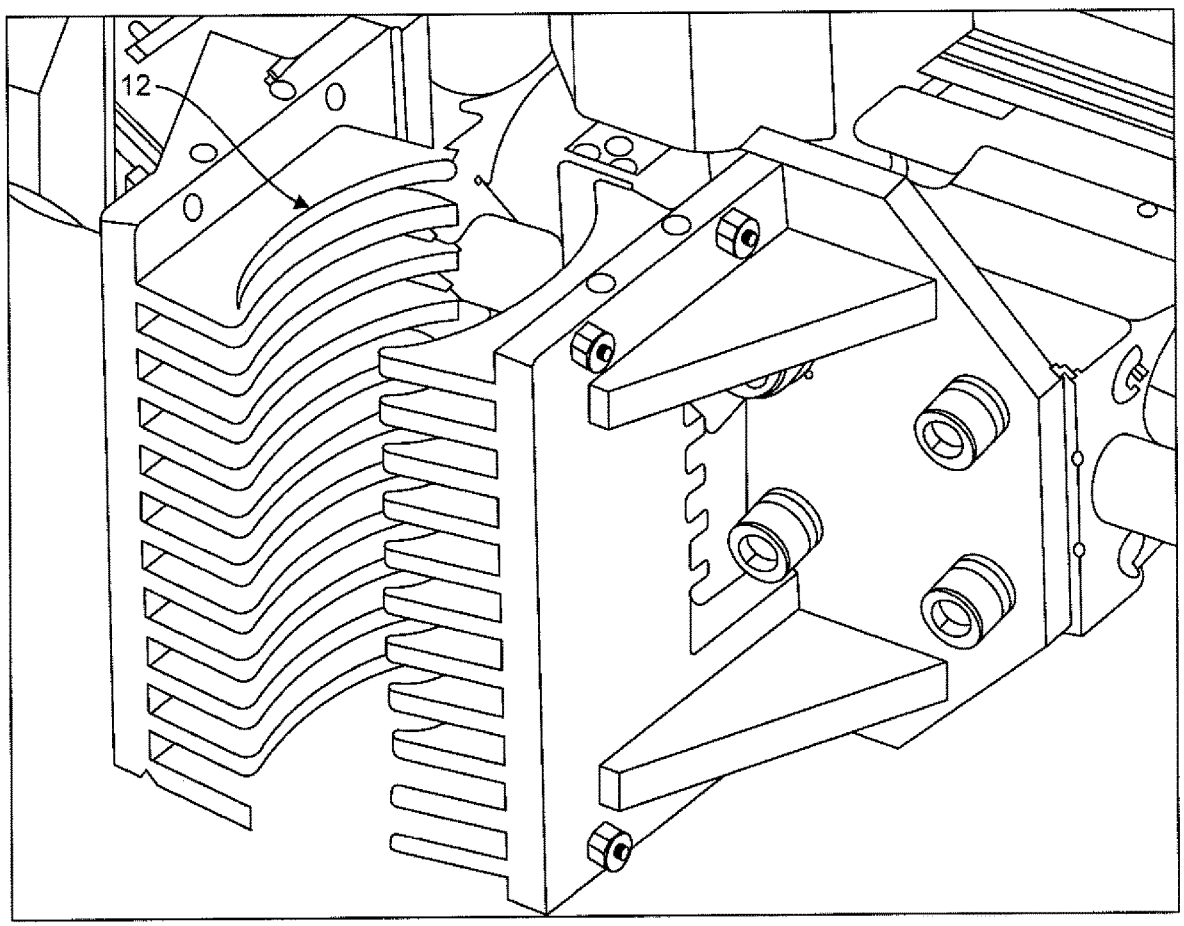
FIG. 6A-B shows crescent shaped gripper plates: Open position (A), Closed Position (B).
Figure 6B:
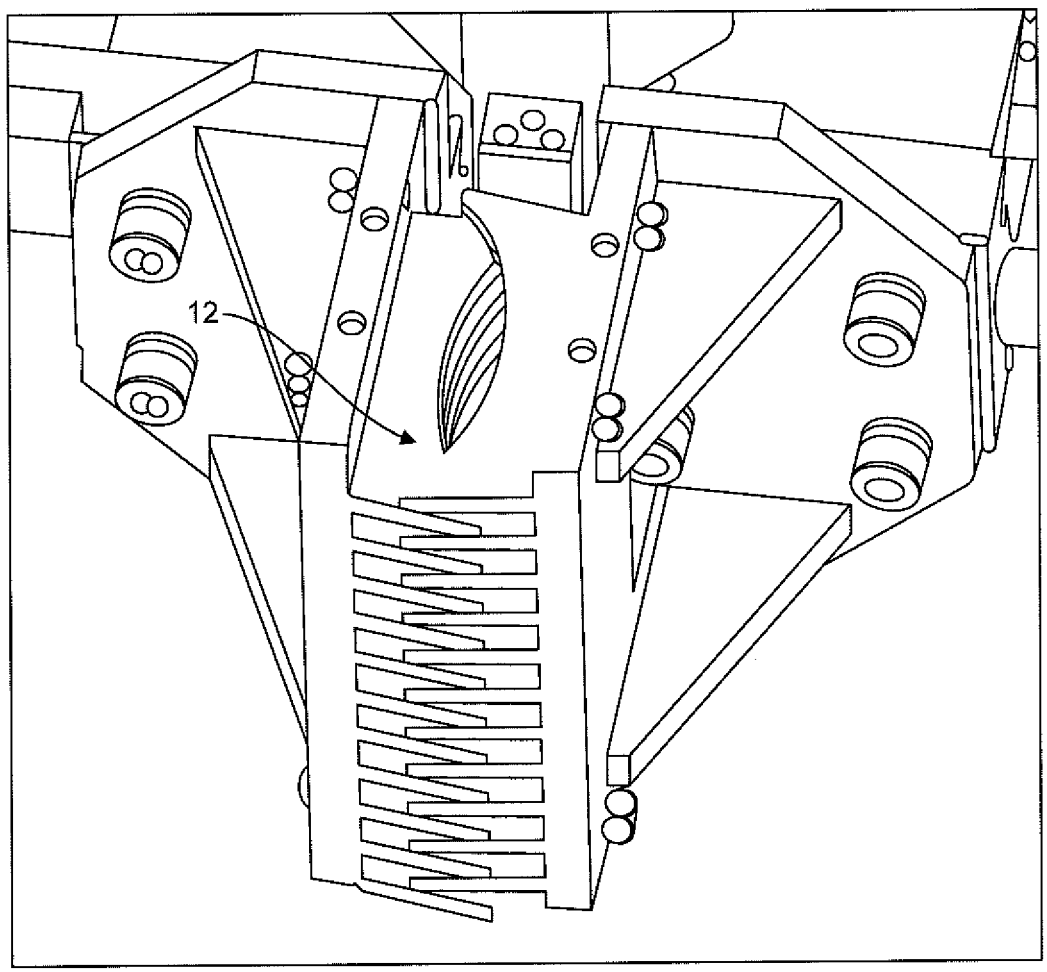

The parallel plates (6) of the preferred embodiment could also be replaced with a stack of crescent shaped plates 12 on either side of the plant, as can be seen in FIG. 6. On each side of the gripper mechanism, there can be an alternating pattern of a crescent shapes (with concavity facing the plant), and an open space. The pattern of crescents on the opposite side can be offset vertically so each crescent plate on one side aligns with an open space on the other. The offset alternating crescent shapes interlock as the plates are driven towards each other. As the opposing crescent shapes travel toward each other, they can force the plant to the median plane between the gripper plates. When fully closed, the plates contact the plant on alternating sides through the full vertical height of the plates.

Flexible Rope Material

Figure 7A:
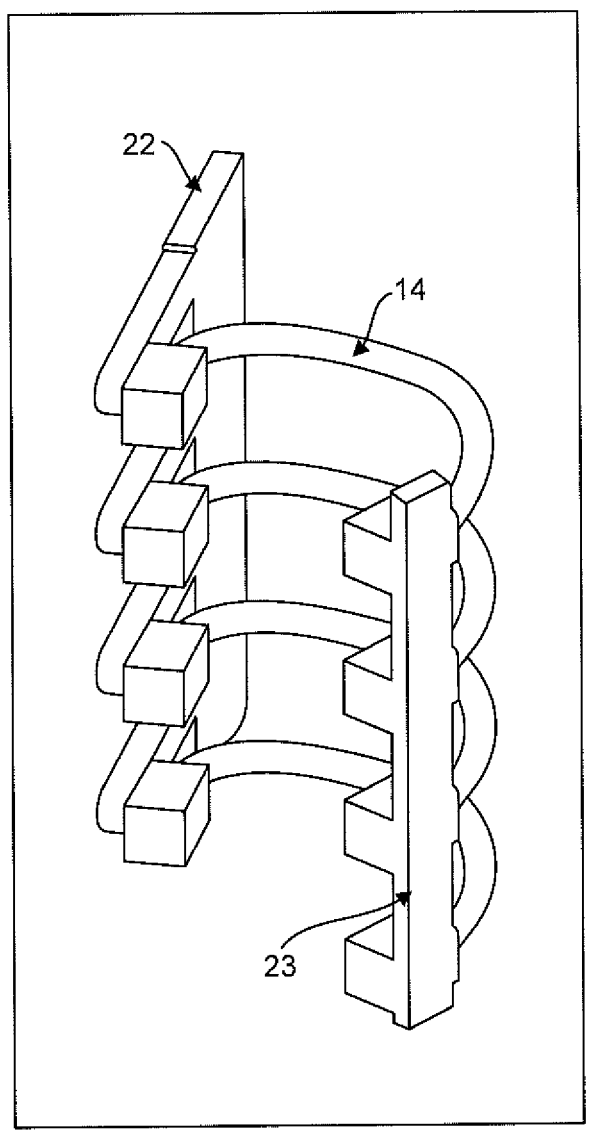
FIG. 7A-C shows flexible rope grasping mechanism: Open (A), Open around plant (B), Grasping plant (C).
Figure 7B:
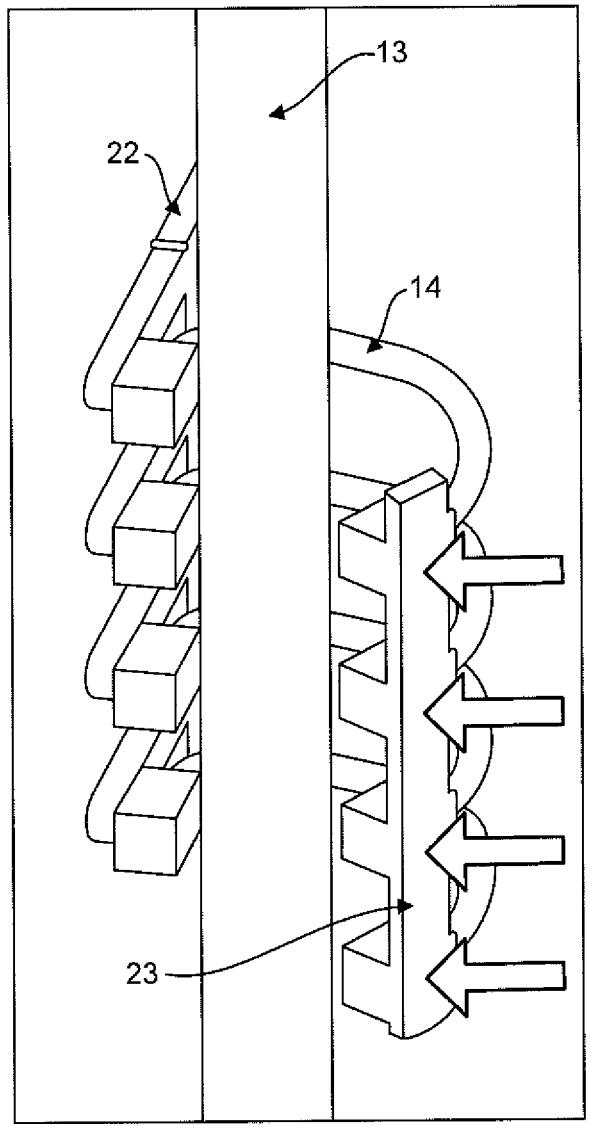
Figure 7C:
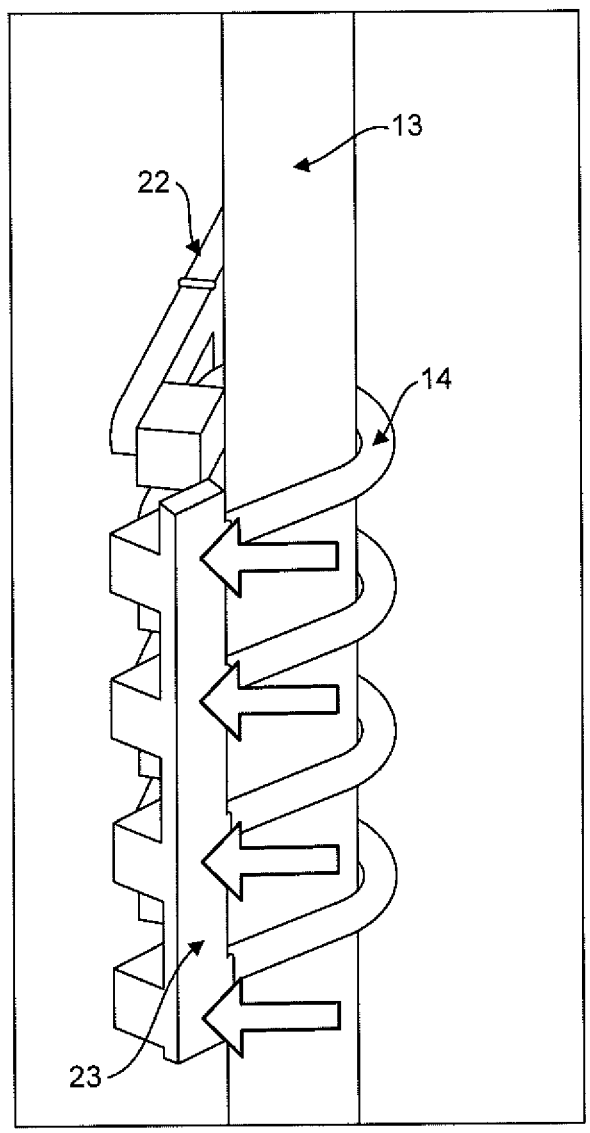

An alternate embodiment of the plant grasping mechanism that is a derivative of the existing manual root pulling process and manipulates a flexible material such as a rope such that it wraps around the plant or plant stalk (FIG. 7). The existing manual or hand-pulling technique uses a slip knot that tightens around the plant as a vertical force is applied by a person. This embodiment of the RPF device uses a similar design. Specifically, an array of ropes 14 (three to five) is arranged vertically with a proximal end of each rope attached to a vertical static member 22 and the distal end of the rope attached to an actuated vertical bar 23. The vertical bar 22 and 23 begins in a position such that they are spaced at a distance significantly wider than the diameter of the plant. The ropes have appropriate slack so that in the open position they formed a "U" shape that opened towards the plant. The vertical array of ropes essentially create a saddle to grip plant 13. Once this array was moved into position with the plant sitting in the saddle, vertical bar 23 is actuated such that it travels around the plant to create a set of loops that tighten around the stalk. Using multiple ropes has the same effect as using taller plates to prevent stress concentrations on the plant that could cause breakage.

Cam and Plate

Figure 8A:
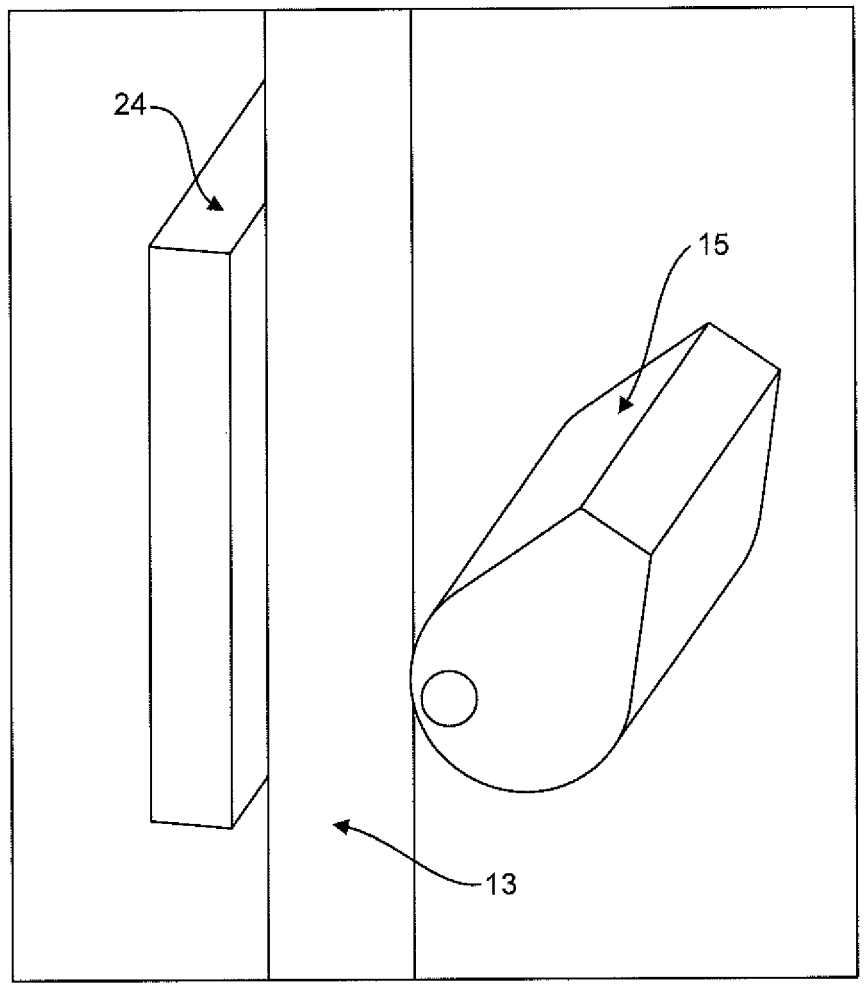
FIG. 8A-B shows a cam and plate grasper gripping on a plant stalk (12): Open (A), Gripped on plant (B).
Figure 8B:
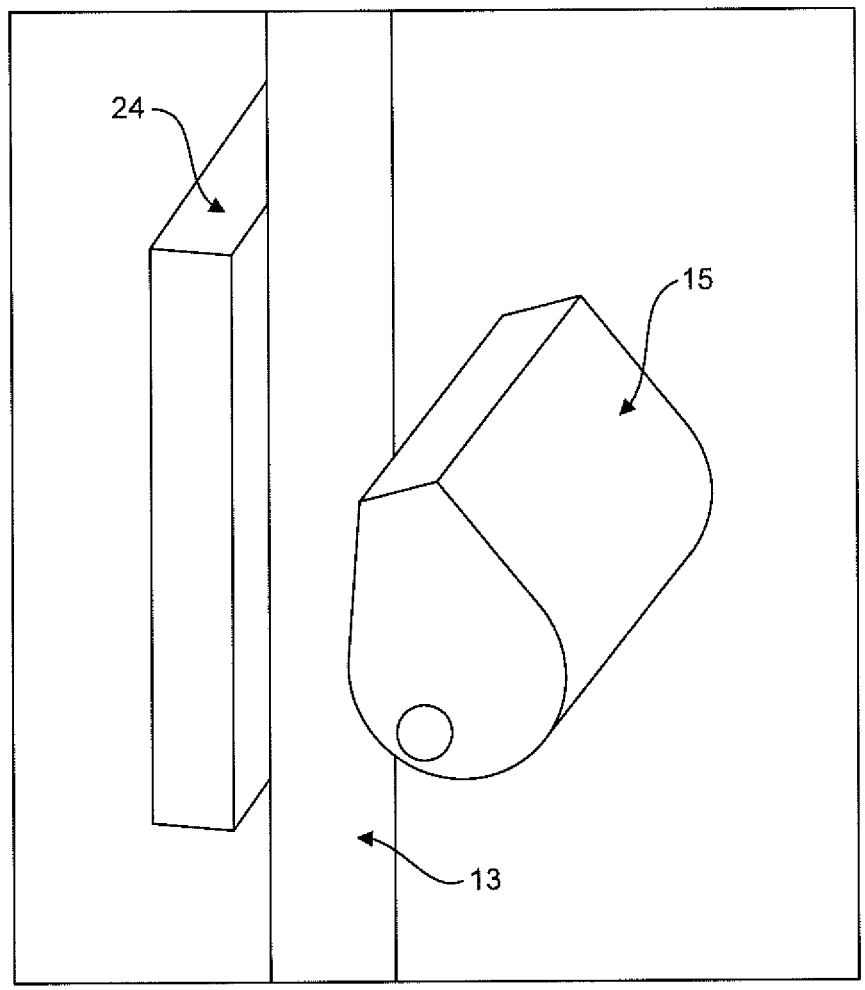

An alternate embodiment of the grasping mechanism employs a cam and plate to passively grip onto the plant rather than using an actuated mechanism. The mechanism (shown in FIG. 8) employs flat plate 24 and cam 15. The RPF device moves the grasper downward onto the plant stalk, positioning the stalk between the cam and the plate. This embodiment is designed so that a gap exists between the cam and the plate that can increase as the cam/plate mechanism is moved down over the plant. Dependent on the plant type, the upper portion of the plant may need to be cut off to allow the cam and plate apparatus to be moved downward over the plant. Once in position, to start pulling the RPF mechanism moves the cam and plate upwards causing the cam to rotate (via friction between the plant and the cam) and drive the plant stalk into the plate. Eventually the force between the cam and plate is enough to grip the plant without slipping such that the plant could be pulled from the soil. The cam and plate can be textured, similar to the vertical rods of the preferred embodiment, to allow for better grip on the plant.

Linkage

Figure 9A:
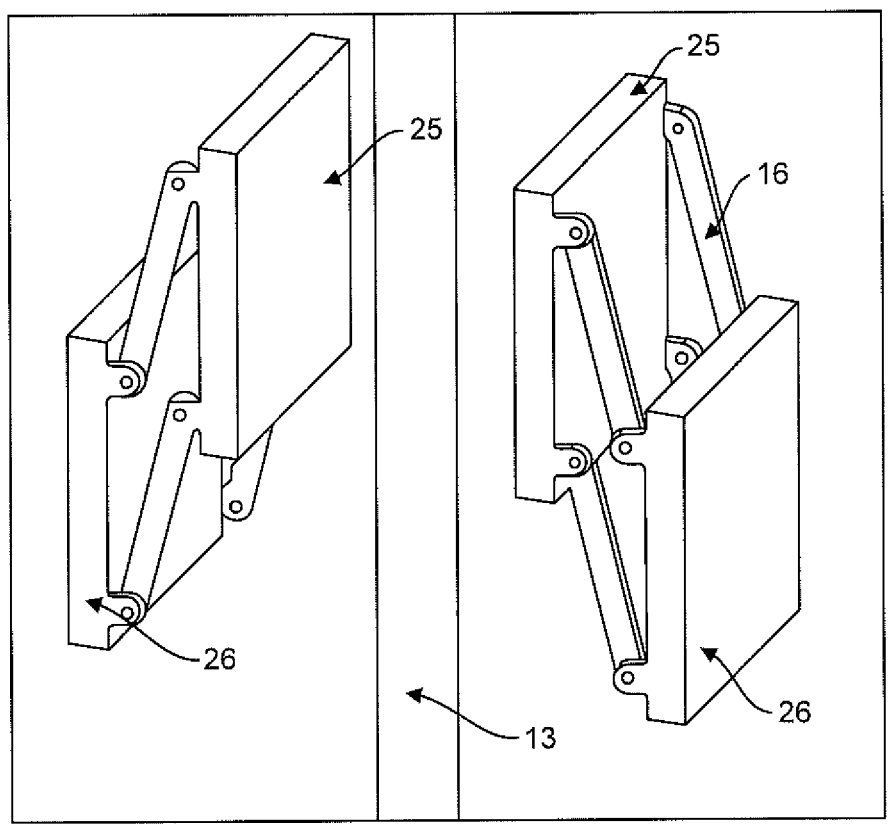
FIG. 9A-B shows linkage grasping mechanism gripping plant stalk (13): Open (A), Closed on plant (B).
Figure 9B:
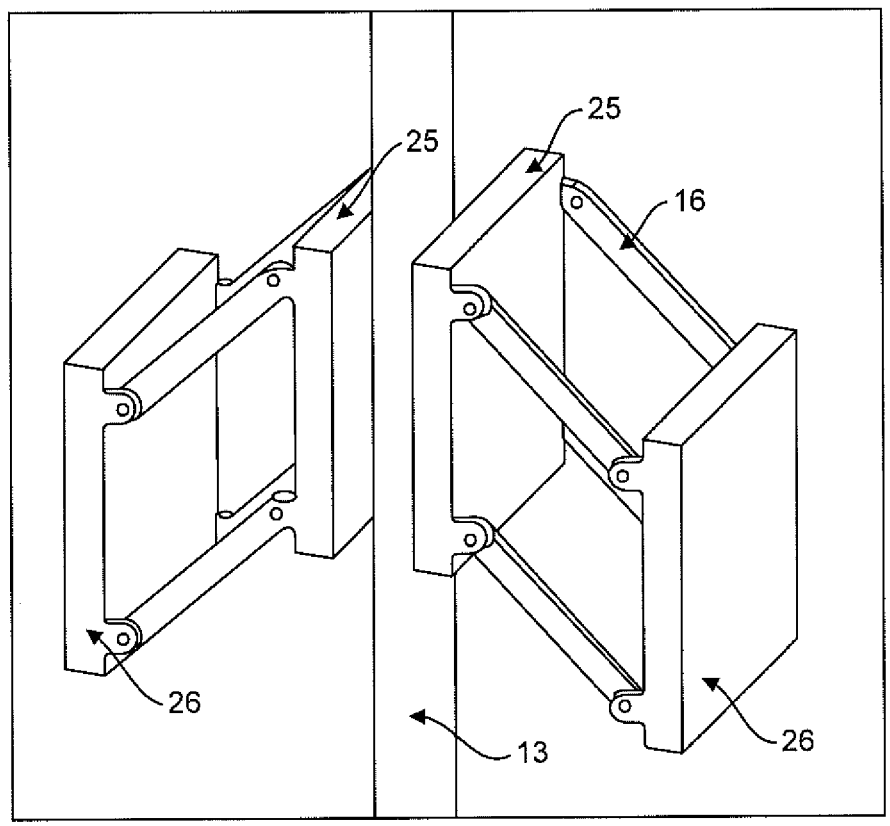

An alternate embodiment of the grasping mechanism operates in a similar manner to the cam plate design. Instead of a cam, however, this design employs linkage 16 that can actively rotated to an opened or closed position (FIG. 9). This embodiment has two flat fixed plates 25, 26, each attached to linkage 16, the opposite end of the linkage would be attached to gripper plates 25, 26 so that the two gripper plates 25, 26 are parallel to each other. The RPF device position the grasping mechanism so the plant stalk is centered between the two plates 25, 26. The linkages rotates to position the opposing plates on the either side of the stalk. The fixed path of the linkage is designed such that, similar to the cam, as the grasping mechanism moves upwards the plates continue to move towards each other, increasing the gripping force as they move up. Again, both plates need to have a textured surface similar to the vertical rods in the preferred embodiment.

RPF Motion Mechanism

For the RPF device to move through the field, it can have a stowed configuration where it is contained in a volume that fits in the space between rows of planted crops. The device must then be deployed from its stowed orientation to a position that locates the grasping mechanism around the stalk of the plant. This motion can be rapid to reduce the overall cycle time between successive plant pulling events. At the same time, the motion can be controlled to accurately place the grasping mechanism and to avoid damage to adjacent plants or the mechanism itself. It is preferable for the path of motion to be easily programmable to several variable paths depending on external conditions, plant type, plant age, etc. A fixed-path mechanism severely limits the type and size of plants that can be pulled. For instance, a mechanism that can only come down on a plant from above may not work on a full-grown maize plant with ears growing at the bottom of the plant slightly above the gripping point. Along with placing the grasping mechanism properly, the motion mechanism can also provide an upward pulling force to extract a plant from the ground. In the preferred embodiment this force is applied at a fixed velocity. Moving at a fixed velocity in a direct upward motion reduces the error in root pulling force measurement that could occur from non-zero acceleration paths and angled pulling motion.

One embodiment of the RPF motion mechanism is a set of three orthogonal linear actuators. Similar to the grasping mechanism, the motion mechanism actuators comprise a slide moved by a ball screw which is powered by an electric motor. All three actuators are attached in series. Referring again to FIG. 1, the Y actuator 1 moves the grasping mechanism into and out of a row of planted crops (perpendicular to the crop rows). A second actuator 2 is connected to the Y-actuator and provides vertical motion (Z-actuator). The Z actuator provides the pulling force to the grasping mechanism and is the only actuator that moves during the pulling sequence. Below the Z-actuator is X-actuator 3 which runs parallel to the row of corn and helps to align the grasping mechanism to the plant that is to be pulled. The plant grasping mechanism described in a previous section of this disclosure is attached to X actuator 3.

Using three independent actuators allows the grasping mechanism to be moved through any path within its allowable travel envelope. Typically, the control system moves the grasper to the appropriate position in the X-Z plane, then move into the row of planted crops using just Y-Actuator 1. During the pulling sequence, only Z-actuator 2 is used to ensure motion of the pull is directly upward. After the pull is complete, the grasper is moved out of the row using Y-actuator 1, then returns to a stowed position through movement in the X-Z plane.

Each of these actuators is outfitted with an encoder that tracks the position of the slide along its length of travel. This allows the control system to know the exact location of the grasping mechanism in space which allows the grasper to be aligned with the plant for pulling. A sensor set is included with the RPF mechanism to determine the location of the plant. This sensor set is described in the Plant Location Identification section.

Alternate embodiments of the RPF mechanism exist to address positioning the grasping mechanism and providing upward pulling force. Many of these alternate designs replace the linear actuators with different devices while still maintaining a similar linear motion of the device. Some, however, replace the linear motion of the preferred embodiment with a combination of linear and rotational motion.

One skilled in the art can recognize that examples of these alternate embodiments are not limited to the ones outlined below.

Hydraulic or Pneumatic Cylinders

An alternate embodiment of this design uses either hydraulic or pneumatic cylinders in place of electric motor-driven actuators. This variation of the design would functionally operate the same as the electric motor-driven actuators by employing separate cylinders for each of the X, Y, and Z motions. Additional sensors can be used to determine the position of each cylinder in order to position the grasping mechanism accurately around the plant. By using three actuators, the mechanism allows for an unlimited range of motion paths within the working envelope, similar to the preferred embodiment.

Linear and Rotational Motion

Figures 10A, 10B:
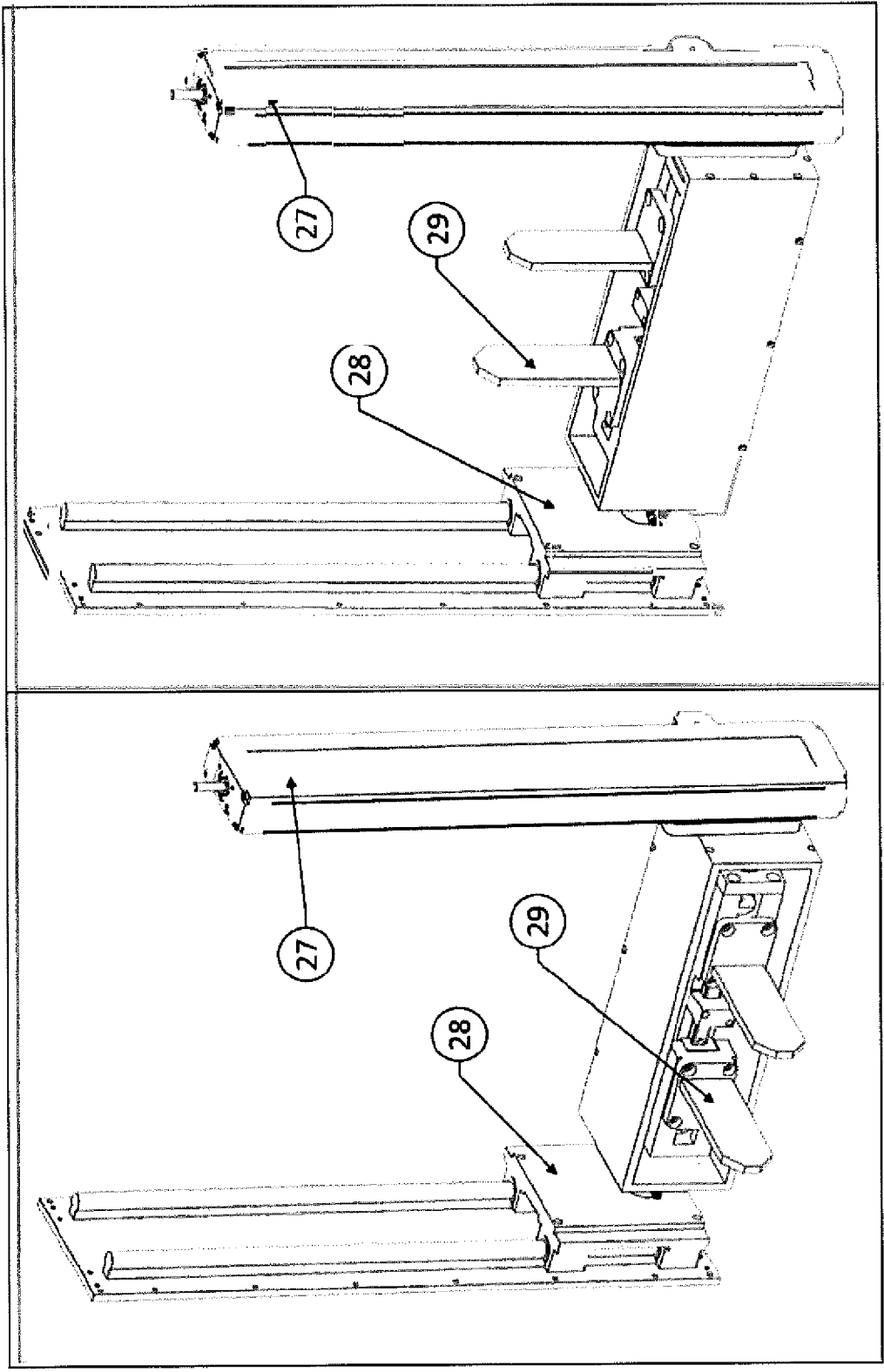
FIG. 10A-B shows linear and rotational motion embodiment: Deployed state (A), Stowed state (B).

An alternate embodiment to the linear motion portion of the RPF mechanism is to employ a combination of linear and rotational motion to position the grasping mechanism around the plant stalk (FIG. 10). This embodiment uses linear actuator 27 to provide vertical (Z) motion for positioning the grasper and to provide vertical pulling force. In place of the Y linear actuator, there is instead a motor 28 connected to an assembly comprised of grasping device 28 that rotates along the horizontal X axis (parallel to the row of corn). Motor 28 rotates grasping mechanism 29 into the row of corn and positions the parallel plates around the corn stalk. After a pulling sequence was completed, the grasping mechanism is rotated so that the parallel plates pointed upward rather than toward the row of corn. This position stows the mechanism for transport through the field. Employing both rotational and linear motion reduces the size of the overall device but also limits the range of motion of the device.

Force Measurement

The primary focus of the force measurement sensor of the RPF device is to measure the force required to pull a plant from the ground. The device has been designed to isolate the pulling motion to a straight vertical motion at a fixed velocity. This is done to reduce error imparted on the force measurement resulting from acceleration, jerk, or angled, non-vertical pulling directions. Measurement of the pulling force is complicated by the presence of plants directly above where the pulling force is applied. Instead of reacting the force directly above the pull, the RPF device reacts the force through the Z-actuator which is positioned in the space between rows of plants. The misaligned nature of this arrangement limits the methods by which force can be measured.

The preferred embodiment of the RPF device uses two redundant methods for measuring force. The first is three-axis load cell 5 (FIG. 1). This style of load cell simultaneously measures the force along three independent, perpendicular axes. By taking three independent, perpendicular measurements, the load cell can minimize the error produced from mis-aligned loads and provide a pure vertical force measurement. Load cell 5 measures force continuously throughout the pulling sequence. The second force measurement is provided by Z actuator 2 which uses an electric motor to actuate an internal ball screw. As the plant starts to resist upward motion, the torque required to keep turning the ball screw at a constant velocity increases. This torque is directly proportional to the force exerted by the ball screw on the linear actuator. The torque output of the motor, and therefore pulling force, can be determined by measuring the current required to drive this motor.

Alternate embodiments of the force measurement method exist that can be implemented on the RPF mechanism to achieve the same results. Some of these methods work specifically with alternate embodiment of the RPF motion mechanism while others work regardless of the design of the rest of the machine. One skilled in the art can recognize that examples of these alternate embodiments are not limited to the ones outlined below.

Strain Gauges

An alternate embodiment of this design replaces the load cell with a slightly compliant member affixed with strain gauges. If the geometry of the member is known, it can be accurately predicted how that member will deform when a force is applied. The magnitude of the deformations can be measured by affixing strain gauges to this member at specific locations and in specific orientations. The measured strain can then be translated to a force exerted on the plant being pulled.

Hydraulic/Pneumatic Pressure

Another alternate embodiment of force measurement can be employed if hydraulic or pneumatic cylinders are used in place of a linear actuator for supplying the vertical (Z) pulling force. In order to provide vertical force using a cylinder, hydraulic or pneumatic pressure must be applied to one side of the cylinder. The force exerted by the cylinder is a product of the pressure of the fluid and the area within the cylinder to which pressure is applied. A pressure measurement device attached to the hydraulic/pneumatic supply at the cylinder would provide constant measurement of the force exerted by the cylinder and therefore the pulling force.

Measurement Interpretation—Preferred Embodiment

Current state-of-the-art techniques for measuring root pulling force have focused on the maximum force applied to a plant during pulling. This is largely due to the limitations of the equipment used for this manual process. Currently hand dynamometers are connected to the stalk of a plant with a rope. The stalks are then manually pulled upward until the plant breaks free. The dynamometer provides an output of Maximum Force and can also provide a force vs time curve for the pull. Because the pulling is done manually and at a varying velocity, however, this curve provides little information and only maximum force can reliably be used to correlate force to root system architecture attributes.

The current embodiment can provide significantly more data regarding the root pulling sequence for several reasons. First, as it moves the grasping assembly upward, the Z-actuator encoder can measure very small incremental motion. The position of the Z-actuator is logged along with the measured force and measured motor current. A curve can be created by plotting the required pulling force versus the position of the grasping mechanism. Assuming there is no slippage on the plant, this method can provide information about the force required to pull the plant as well as the distance over which that force was applied. Integrating this curve provides the work required to pull the plant. In short, an analogue pulling force measurement in conjunction with a maximum pull force measurement may provide even more insight regarding the root system architecture and phenotype (e.g. plant elasticity, periodic spikes in force may indicate when portions of the root structure breaks or more dense areas of the root structure, etc.).

Force Reaction

The force required to pull a full-grown plant from the ground can be significant (on the order of several hundred pounds for maize). This force must be reacted through the apparatus that supports the RPF device. The apparatus can be rigid enough to prevent excessive flex when a plant is pulled. The apparatus can also be positioned in a way so that it does not move during pulling. Excessive flex or movement in the apparatus can be interpreted as vertical motion of the plant (thus reducing accuracy of the Force v. Position measurement).

Figure 11:
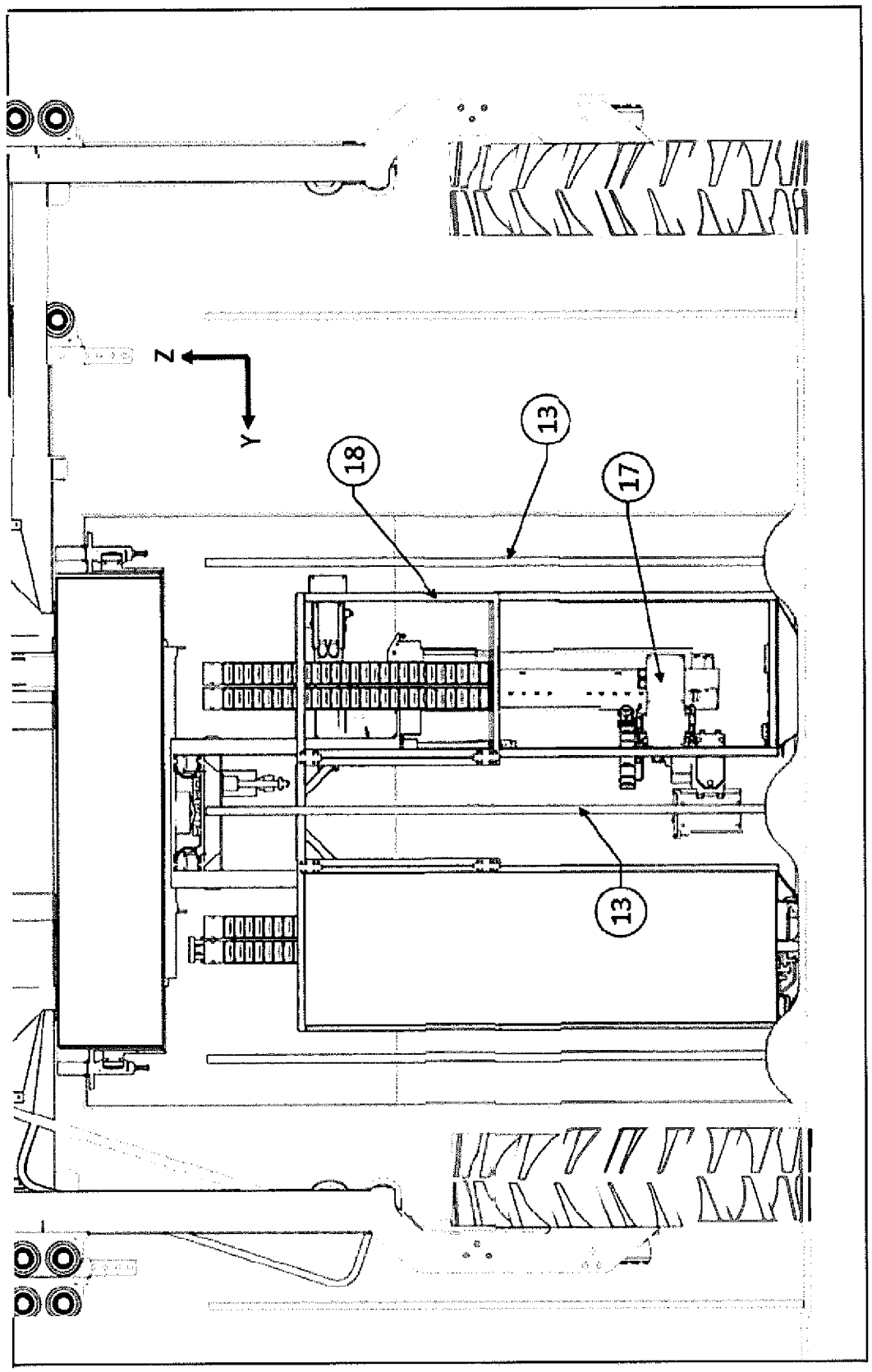
FIG. 11 shows RPF Device (17) deployed on a frame that straddles the plant row.

The preferred embodiment for force reaction is through frame 18 that straddles the row of the plant 13 that is to be pulled (FIG. 11). The frame contacts the ground in the empty areas between the rows on either side of the plant. By straddling the plant, the root pulling force is reacted through the center of gravity of the frame and does not cause the frame to tip in either direction. The bottom portion of the frame that contacts the ground has a large landing plate (30) that spreads the load out over a larger area (thus decreasing the pressure on the soil). Increasing the contact area reduces the distance that the supporting soil will compress during pulling. The preferred embodiment of this apparatus is made of structural members with appropriately located reinforcements and gussets to limit the flex of the system.

This support frame 18 has an inverted 'U' shape with each leg of the frame contacting the ground on opposite sides of the row of plants. The position of the cross bar that connects the two legs must be high enough to clear the row of plants that it straddles. Having sufficient height clearance allows this device to be moved through a field without impacting plants that are not being pulled.

Figure 13:
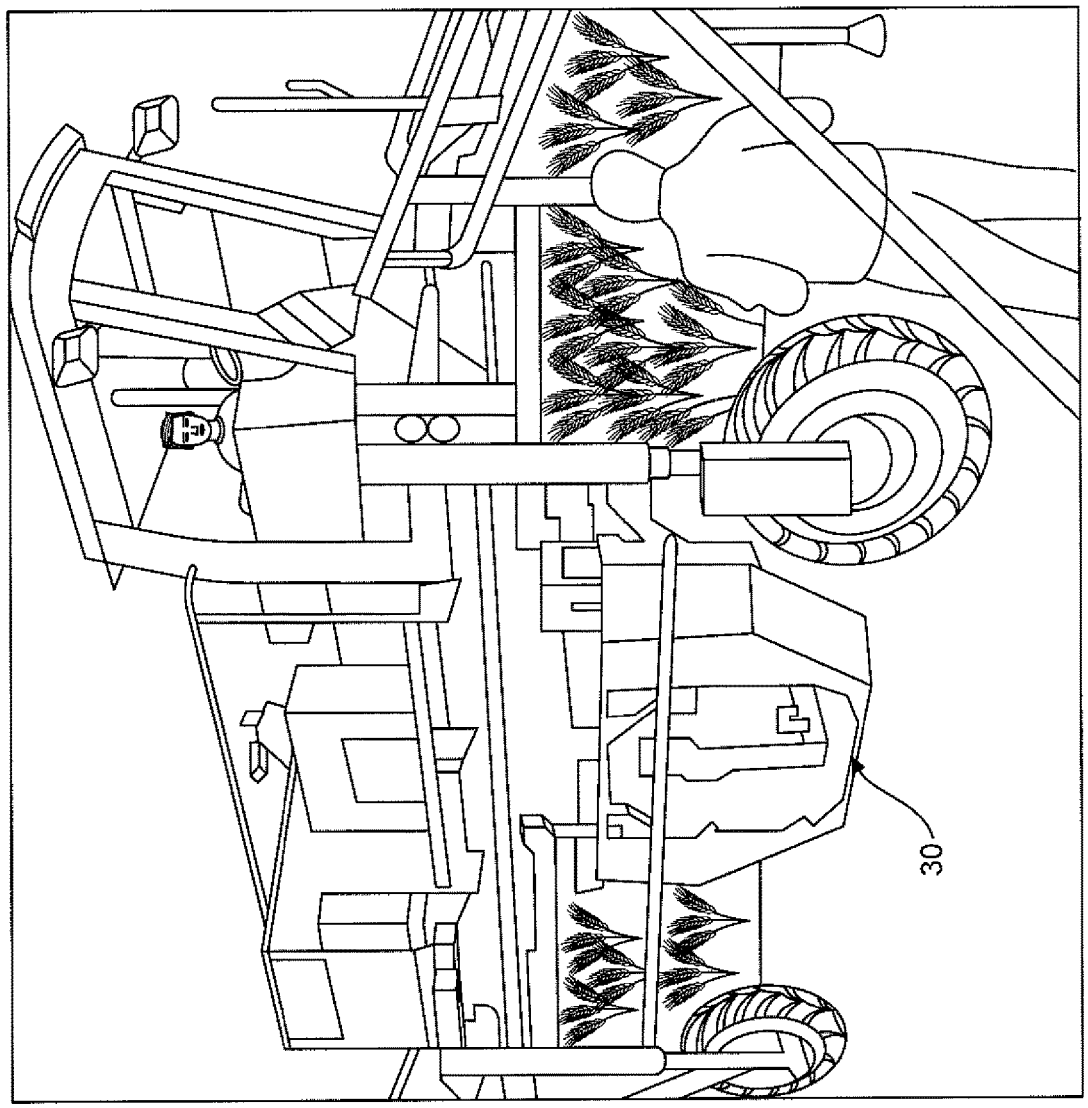
FIG. 13 is a picture of the RPF device attached to a high clearance vehicle.
Figure 14:
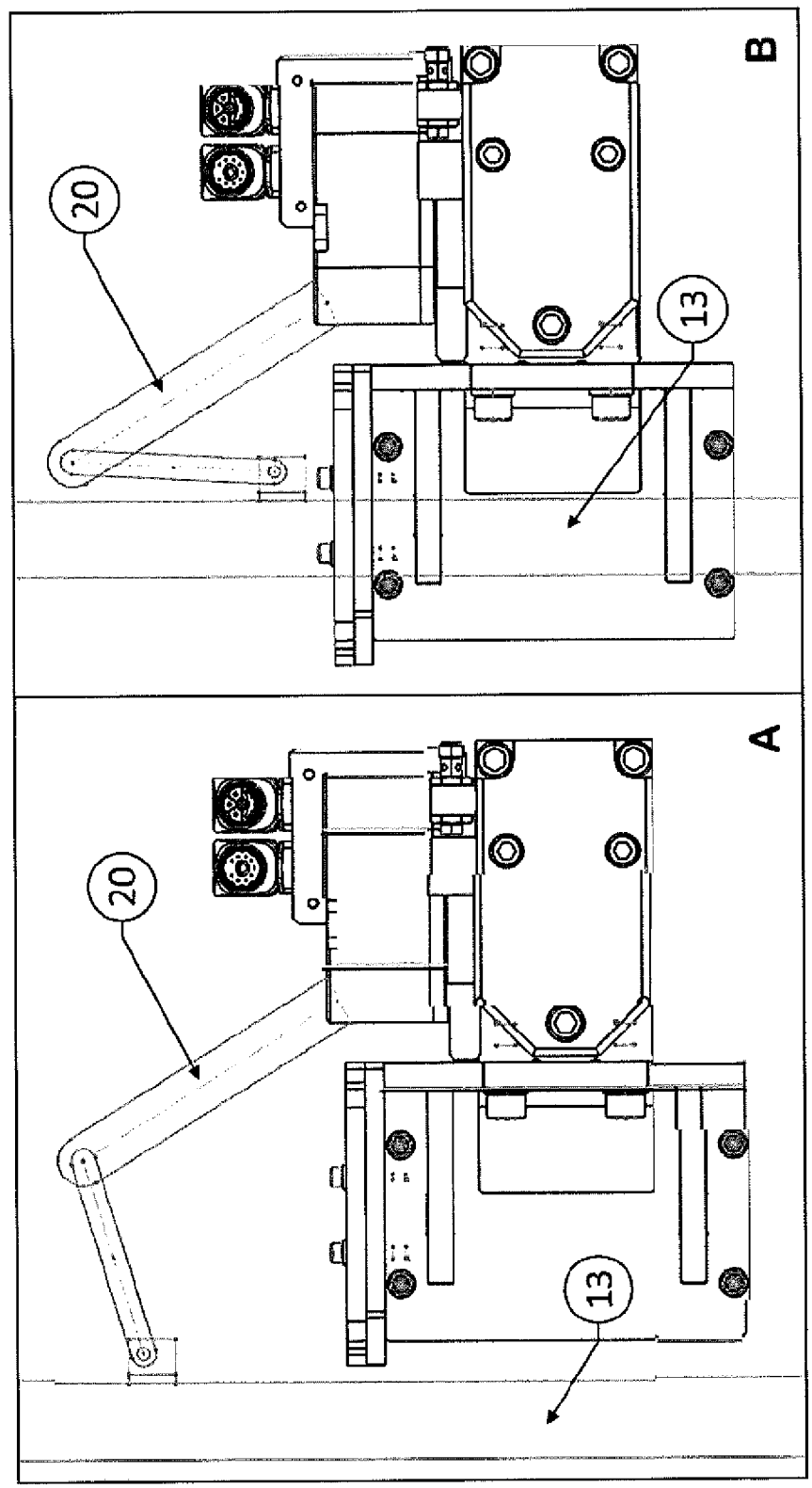
FIG. 14A-B shows a pressure plate plant locator: Deployed in contact with plant (item 12) (A), Retracted with plant in gripper (B).
Figure 15:
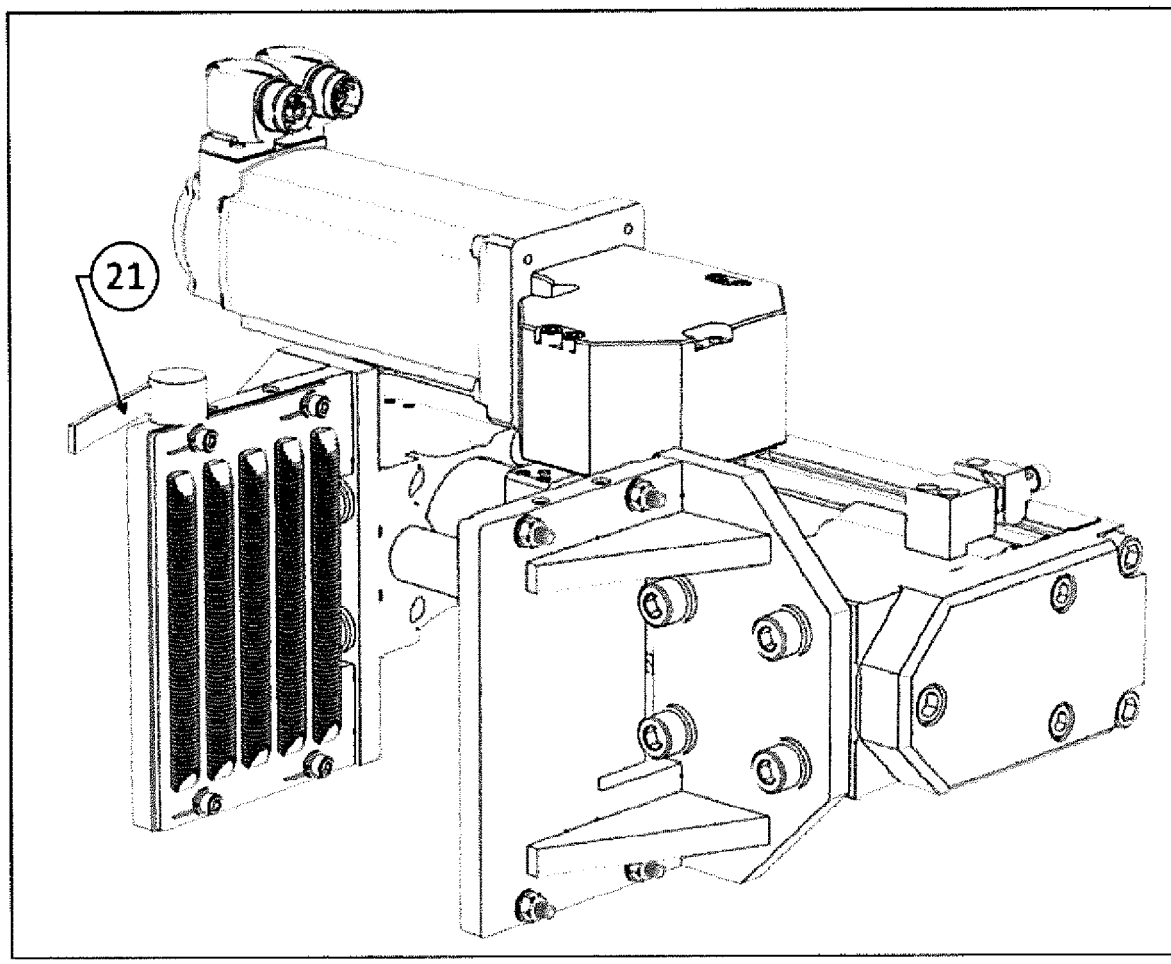
FIG. 15 shows a mechanical flag plant identifier.

A full prototype of the RPF device has been created and tested in the field to pull maize plants (FIG. 13). The prototype travelled through the space between two planted rows. Two outriggers 19 were installed on the mobile cart that fold down through the row of maize and make contact on the ground in the adjacent row. This replicates the force reaction of the preferred embodiment. It was tested near the maximum pull force expected in the field, and the frame was able to easily support the force without measurably compressing the soil providing the force reaction.

Plant Location Identification

In order to position the grasping mechanism around a plant, the RPF device must first identify the location of the plant that is to be pulled. In the preferred embodiment of the RPF device, the support frame is connected to a high clearance vehicle or tractor (FIGS. 12 and 13) that raises and lowers the frame as the tractor moves through the field.

The preferred embodiment of this device uses plant detection sensor, such as a light bar sensor, to identify the plant's location. This sensor has two parts, a horizontally mounted visible light bar and a receiver. The light bar is mounted to the RPF device near the ground while the receiver is mounted on the opposite leg of the supporting frame located on the opposite side of the row of plants. If an object exists between the two, it breaks the light beam and the receiver indicates this as a null reading. The distance between the individual lights is less than the diameter of the plant stalk. When a plant exists between the two arrays it will block multiple consecutive beams. The controls system can interpret this as the existence of a plant or plant stalk.

Since the light bar is a straight array of sensors, the output of this sensor only provides the location of the plant in one dimension, in this case the X dimension. The Y and Z positions of the grasping mechanism in this embodiment are less critical and are relatively consistent from pull to pull. In the preferred embodiment, trajectory used to position the grasping mechanism in the Y and Z position is a fixed path with only the X dimension varying based on feedback from the plant location sensor.

The vertical (Z) positioning that is used in this embodiment to locate the grasper will be a fixed distance above the ground. As previously described, the force reaction is through a frame placed on the ground next to the plant. Because the variation in ground height between where the plant is located and the open area next to it is relatively predictable, a specific vertical position can be set with an assumed offset from the ground. This offset must be large enough (6-8 inches) to account for any variation in this ground height throughout the field so that the grasper does not unintentionally contact the ground when it moves into position to pull the plant. The final positional dimension needed to locate the grasper for pulling is the distance the grasper must move into the row of corn (Y-dimension). Although the crops are usually planted in very straight rows, the location of the frame with respect to the row when it is placed on the ground can vary. There is a limit, however, to the positional variation of the frame based on the size of the frame and the size of the opening between rows. As was mentioned previously, in the preferred embodiment of this mechanism, the support frame and therefore the RPF mechanism is attached to a tractor that drives through the field. This tractor is outfitted with GPS guided steering (Trimble or similar) which allows the tractor to travel along a straight line throughout the field within 1, 2, 3, 4, 5, 6, 7, 8, 9, 10, 11, or 12 inches of a perfectly straight trajectory. The magnitude of this positional variation is used to size the depth of the parallel plates 6 on the grasping mechanism. These plates are made large enough in the Y-direction so that they grip on a plant regardless of the position of the frame. By sizing the plates in this way, the grasping mechanism can be moved to a fixed location in the Y-direction without any required feedback that relays the position of the plant in that direction.

The light array sensor can also be used to filter out unwanted growth characteristics that may lead to non-representative pulling force measurements. For example, there are instances during planting when two seeds are planted in the same location and multiple stalks emerge. As the stalks grow, they would remain close together. The light bar would sense this as a larger than expected number of consecutive blocked light beams. The control algorithm can have an upper threshold of consecutive blocked beams and indicate the measured plant as non pullable. In the same way, the light bar can be used to filter out plants that are next to previously pulled locations which can also effect pulling force. The control system can be set up to only pull plants that exist between two other detected stalks.

Figure 12:
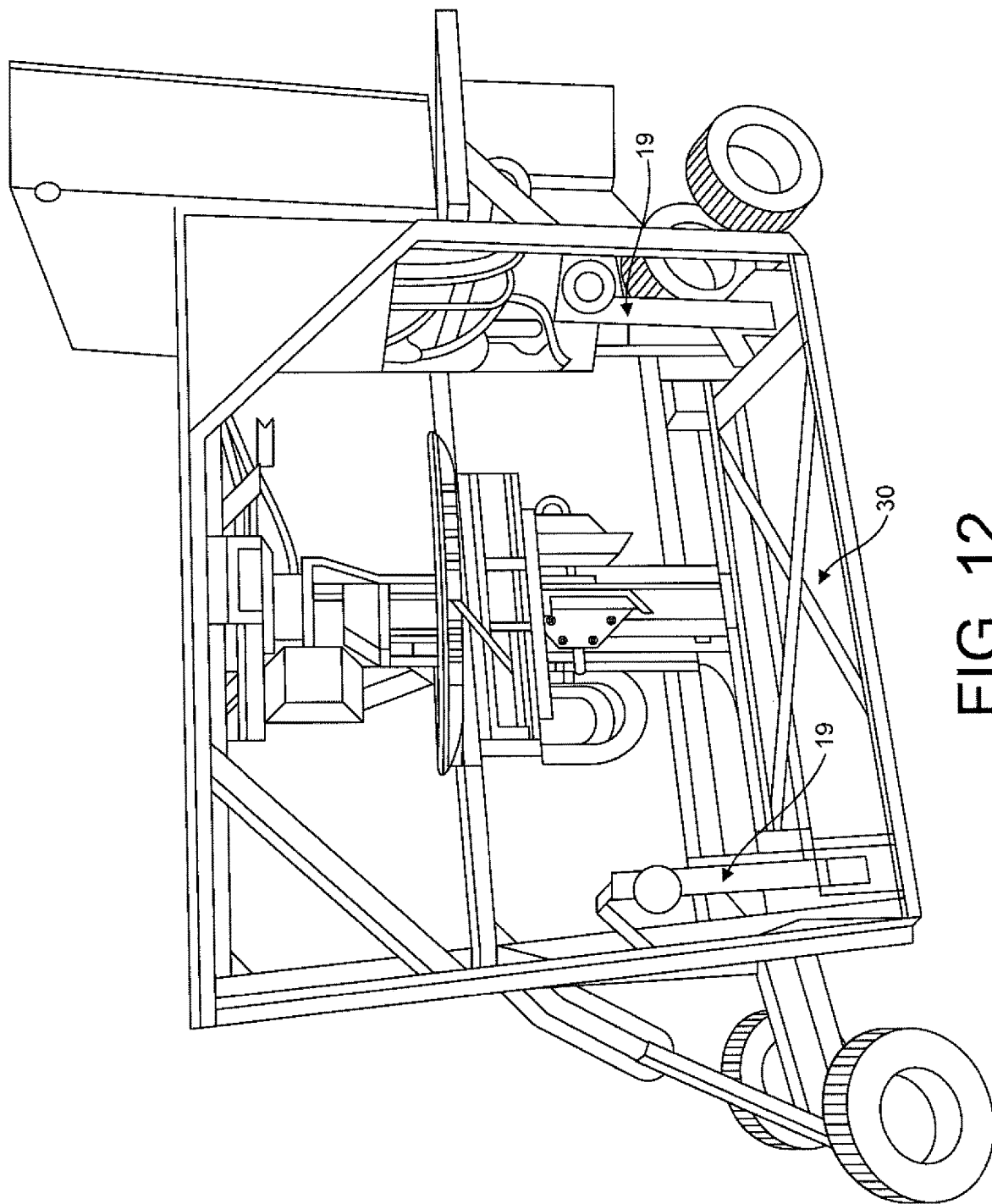
FIG. 12 is a picture of a prototype of the mobile RPF device.

While an automated version of this device that can identify the location of the plant and automatically move into position is ideal, a manual operation of this device is also useful. This mode of operation was used on the mobile cart (FIG. 12). The user can use a joystick or equivalent to move the grasping mechanism via the X, Y, and Z actuators, as well as open and close the grasping mechanism. This mode can also be deployed on a platform attached to a high clearance vehicle with a camera attached to the support frame so the user can view and operate the RPF mechanism from a remote location on the vehicle.

A vision system camera can be installed at the same height as the plant grasping mechanism. The camera can be located approximately 6, 12, or 18 inches to the side of the grasping mechanism and can be attached directly via a mounting bracket on the plant grasping mechanism. By locating the plant grasping mechanism and camera on the same platform, the local coordinate system for the two pieces are the same and are only offset by a fixed distance.

During operation, the camera can take a photo of the area directly in front of the vertical Z actuator. The camera control system evaluates the image and searches for preset plant characteristics. During this evaluation process, the vision control system can determine if a high enough number of features have been recognized to signal that a plant has been positively identified. From this, the vision system can identify the position of the center of the plant stalk and communicate that information to the RPF controller. The controller uses the location information to position the RPF mechanism to pull the plant.

This system uses both pattern recognition and a measurement of the proximity of identified features. The system may identify a number of features, but only recognizes them as a plant if they are within a specified distance from each other.

Figure 16:
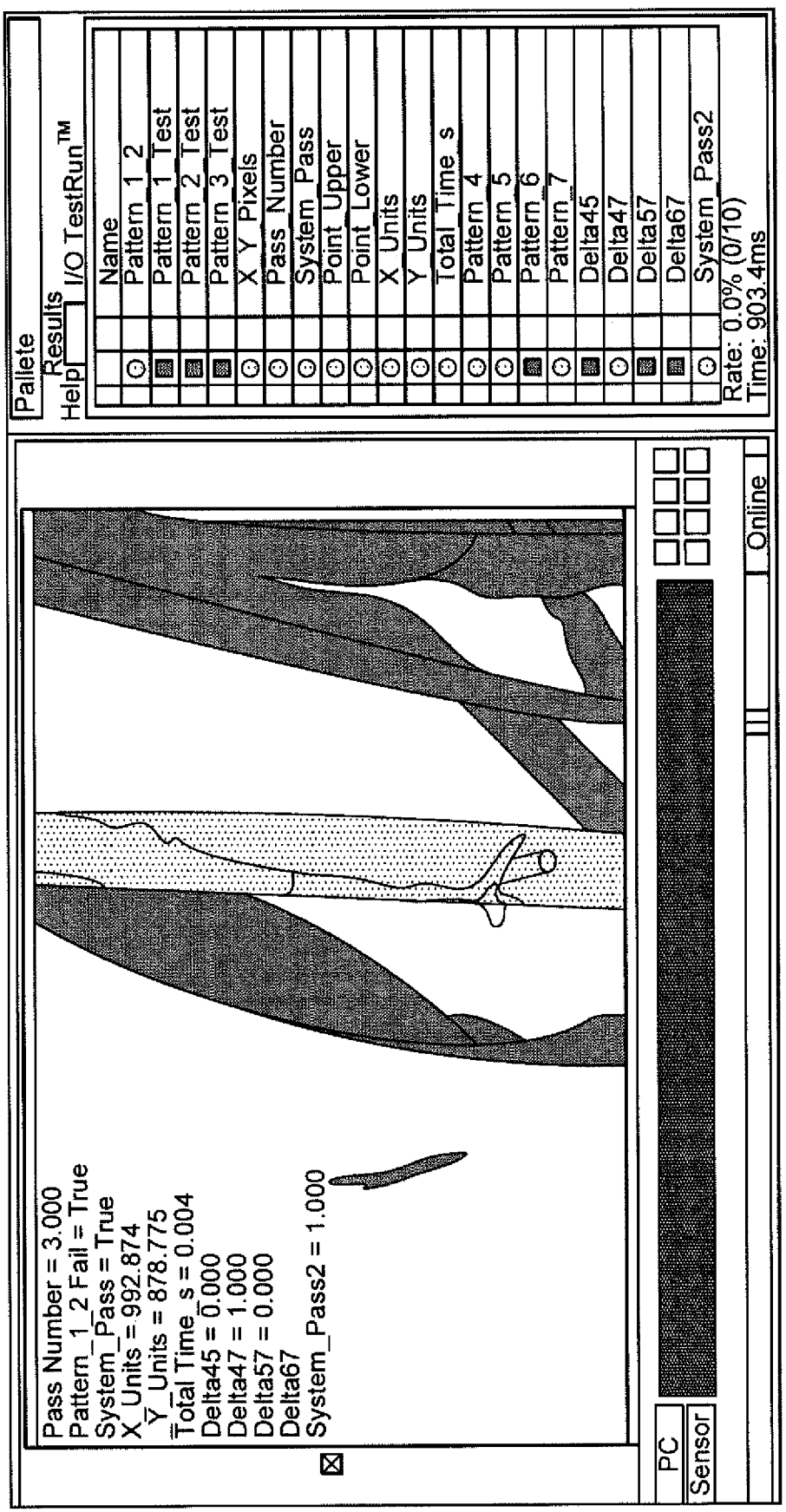
FIG. 16 is an output of vision system of positively identified plant.

Once the plant is positively identified, the vision system can relay its position to the RPF device so it knows where to move to pull. The vision system software identifies the position of the stalk (FIG. 16, circle), which is then used by the RPF as the position of the plant to be pulled. The major benefit of this type of system is the ability to "train" the controller to search for, and filter certain features. These features can be changed to allow the system to identify plants at different stages of growth, or of different plants altogether. During this "training" process, the user can establish a set of criteria and a pass/fail percentage. The sensitivity of the filters or criteria used can be adjusted.

Alternate embodiments of the plant location identification method exist that can be implemented on the RPF mechanism to achieve the same results. One skilled in the art can recognize that examples of these alternate embodiments are not limited to the ones outlined below.

Lidar System

An alternate embodiment of the plant location identification method is to employ Light Detection and Ranging (LIDAR) to locate the plant. LIDAR is a sensing method that projects laser pulses on an object and measures the reflected pulses with a sensor. A control computer can then interpret this data to develop a three-dimensional image of the objects within the field of view of the sensor. The RPF mechanism can employ this type of sensor to develop an image of the plant to be pulled (or at least the position of the plant stalk) and derive a plant location based on that image.

Ultrasonic Sensor

An ultrasonic sensor can also be used to identify the plant location in a similar manner to the LIDAR system. Ultrasonic sensors operate in a similar manner to LIDAR but in place of laser pulses, this sensor emits and measures sound waves as they are reflected off objects. This information can then be interpreted to determine plant location.

Pressure Plate

An alternate embodiment of the plant location identification method is a pressure plate and linkage 20 mounted on the RPF grasping mechanism. The pressure plate senses when it makes contact with an object. This plate is mounted just past the end of the parallel grasping plates so that as the grasping mechanism moves towards a row of plants in the Y-direction, the pressure plate contacts the plant before the plant enters the grasper. Once contact with the pressure plate is made, the control system can interpret the location of the plant with respect to the parallel grasping plates and adjust the position of the grasping mechanism accordingly, so the plant locates directly in between the two parallel plates. Once the grasping mechanism is positioned correctly, the pressure plate is pulled back to allow the grasping mechanism to move into the row of plants.

Mechanical Flags

An alternate embodiment of the plant location identification method is to use a spring-loaded mechanical flag that contacts plant stalks to determine location. Flag 21 attaches to the grasping mechanism and extends outward towards the row of plants slightly past the end of the grasper parallel plates. The RPF motion mechanism moves the grasping mechanism so the end of the flag is in the row of plants, but the grasper plates are not. Once in position, the motion mechanism moves the grasping mechanism and the flag in the X direction. As the flag contacts a plant stalk, it can bend or be rotated out of the way until it has moved past the plant. The flag is affixed with a sensor to interpret when the flag bends or rotates. The control system then correlates the position that the flag bends to a position along the X actuator. That X position is used to position the grasper for pulling.

Interference Feedback

An alternate method for positioning the grasping mechanism around a plant does not require the location of the plant to be known but instead relies on accurate plant spacing and feedback from the system if the mechanism is placed improperly.

Planting technologies are able to very accurately and consistently place seeds during planting so that there is an equal and predictable spacing between plants. This embodiment of the design uses the known plant spacing and positions the parallel plates a fixed distance apart so that, as the grasping mechanism moves into the row of plants, one and only one plant exists between the plates. The motion mechanism blindly moves the grasping mechanism into a row of plant to a fixed Y position. Since the parallel plates are not infinitely thin, however, there is the potential that they will come in contact with a plant stalk during this Y motion. This contact can resist the motion of the grasping mechanism into the row. The resistance is perceived by the control system as an increase in the torque required to drive the Y actuator. If this occurs, the motion mechanism will reposition the grasping mechanism in the X direction slightly to one side or the other and attempt to move into the row again.

Computer System

The RPF device can also comprise a computer system. This computer system can serve multiple purposes, such as directing the motion of the device through a crop row, directing the device to move toward (and grasp) a plant, and measuring and recording the force required to pull the plant, as described herein. This computer system can comprise software which can power the system, provide instructions, and record data.

Regarding a computer system for directing the motion of the device itself, the platform by which the RPF device moves through a field is discussed in more detail below. The RPF device can be attached to a vehicle, or can be a "stand alone" device. The RPF device can move along a track attached to a vehicle, or can move independently through a field. In both of these scenarios, a computer system can be used to control and/or record the motion of the device. In one embodiment, the RPF device can have at least one sensor mounted to the platform. An alternate embodiment uses a GPS system and known location of rows within the field to direct motion of the platform through the field. Such sensors are discussed in more detail below. This sensor(s) can detect the presence of the actual rows of plants along a pathway and any possible other obstacles, as well as the open pathways in the device's path. The sensor(s) can be in constant communication with a central processing unit, such as a computer where a software program analyzes the data from the sensor(s) and transmits a signal to the actuators that control the RPF device, as discussed herein.

The computer system associated with the RPF device, as well as the RPF motion mechanism, can comprise a CPU and control system with associated software, and a communications system/interface. The computer system can also comprise a power supply (for example, a battery or other energy storage device and associated recharging equipment). It may also comprise a display and/or user interface. The computer system can also comprise a data processing unit, and other components necessary to maintain, operate, and display important information.

Regarding recording RPF data, once the data is obtained, this information can be stored in computer-readable form. The data is then converted into a file type readable to the software used. Such data can be stored using any suitable memory type. The data can then be loaded into a computer system, such as a personal computer or workstation, for analysis.

Implementation

The efficacy of the root pulling force mechanism can be increased if it can be deployed into a field and rapidly moved from one pulling location to another. This allows high throughput compared to current state of the art.

As previously described, the root pulling force (RPF) device is mounted to a frame that can be placed on the ground while pulling. This frame is designed to straddle a row of planted crops which can vary in size but can grow several feet tall. The frame size required to provide clearance above these plants is large and very heavy in order to withstand the pulling forces imparted by the process. Although the frame is quite tall, it must also have a relatively narrow base to allow it to be grounded between adjacent rows.

The preferred embodiment of this device attaches the RPF frame to a high clearance tractor (FIG. 13). The tractor has a mechanism that can lower the RPF frame to the ground and raise it after each completed pull. The interface between the lowering mechanism and the tractor is a set of linear tracks that run the length and width of the vehicle. By attaching the frame to these tracks, the tractor can continue to move slowly through the field while the RPF frame is on the ground taking measurements and the relative velocity between the RPF frame and the ground is zero. Upon completion of a pull, the RPF frame is raised from the ground, brought to the front of the tractor, then placed on the ground again for the next measurement.

Variations on Use

The RPF mechanism has been designed to pull individual plants fully from the soil and to measure the force required to do so. There are several variations that the current or a slightly modified embodiment of the device could be used for as well.

Different Plant Types

The preferred embodiment of the RPF device is designed for plants with a single vertical stalk, such as maize. Slight variations to the design could be used to pull other plants that may have a different phenotypes. For example, the grasping mechanism could be changed to accommodate plants with a cluster of smaller vertical stalks or leaves. This could be a slight change to the gripper plates or even an arrangement that wraps fully around the plant. The grasping mechanism can be easily modified or swapped out with a different design, suited to the particular plant, all without changing the balance of the RPF device. Additionally the RPF support frame could be modified based on plant height and row spacing. The linear actuators can also be modified to supply addition torque if needed for plants with a more robust root system.

Plants that can be used with the disclosed device include, but are not limited to, any monocot or dicot plant, such as Arabidopsis; field crops (e.g., alfalfa, barley, bean, corn, cotton, flax, pea, rape, rice, rye, safflower, sorghum, soybean, sunflower, tobacco, and wheat); vegetable crops (e.g., asparagus, beet, broccoli, cabbage, carrot, cauliflower, celery, cucumber, eggplant, lettuce, onion, pepper, potato, pumpkin, radish, spinach, squash, taro, tomato, and zucchini); trees, fruit trees and plants (e.g., apple, apricot, banana, blackberry, blueberry, cacao, cherry, coconut, cranberry, date, fajoa, filbert, grape, grapefruit, guava, kiwi, lemon, lime, mango, melon, nectarine, orange, papaya, passion fruit, peach, peanut, pear, pineapple, plum, raspberry, strawberry, tangerine, and watermelon); and ornamental plants and trees (e.g., alder, ash, aspen, azalea, birch, boxwood, camellia, carnation, chrysanthemum, elm, fir, ivy, jasmine, juniper, oak, palm, poplar, pine, redwood, rhododendron, rose, and rubber).

In many crops, establishment (whether or not a seed turns into a reproducing plant) is a major factor limiting yield. Selectively breeding for genotypes with better emergence is important in all crops. One of the best ways to determine emergence for a particular genotype is to plant a specified number of seeds and perform a stand count well after the viable plants have emerged.

The preferred embodiment of the RPF device uses a light bar sensor to identify the location of plant stalks. This light bar can also be used to perform stand count when the RPF device is mounted to a mobile platform and moving through the field. This can also be done with a vision-based camera. This is an easy measurement to record without changing the design of the RPF device at all. As a plant enters the front end of the sensor array, it blocks the light that traverses across to the receiver. As the vehicle continues forward, the plant stalk, and therefore the blocked portion of light, continues to move backward along the light bar until it exits the array at the opposite end. Because the spacing between plants is much larger than the resolution of the light bar, the sensor is easily able to differentiate between plants and therefore count the number of stalks in a given row.

There is the possibility for a false reading where the sensor interprets various inputs as a plant, but it is actually something different than a plant stalk such as a leaf. This can be eliminated with the use of a vision-based camera, which can differentiate between leaves and stalks. Because leaves are less rigid than the stalks and more easily moved, the sensor bar is outfitted with a shield of sorts that would move leaves out of the way to prevent them from breaking the light beam. Alternatively, the use of a different sensor set for plant location identification can eliminate the need for shielding capabilities as alternate sensors are able to differentiate between leaves and stalks based on density or thickness.

Stalk Diameter

The stalk diameter of a plant such as maize can provide important information about the development of the plant. A vision camera can detect edge features and efficiently measure the width of a plant. It is also a good characteristic that can be used to compare the effect of different treatments on plants of the same genotype. The RPF device can measure the stalk diameter as a nondestructive test. To achieve this, the grasping mechanism can be fit with smooth flat plates rather than plates with vertical rods. Using flat plates guarantees that the grasping mechanism touches the outer most diameter of the stalk and an accurate measurement is recorded.

To measure the stalk diameter, the RPF mechanism uses the same methods to locate a plant and move the grasping mechanism into position around the plant. Once in position, the parallel plates of the grasping mechanism move towards each other slowly. When both plates come in contact with the stalk and start to compress it, the torque required to move the plates increases. When a slight increase in torque is measured (below any torque that would damage the plant), the grasping mechanism stops, and the position of the plates as measured by the motor encoder is recorded. The distance between these two plates is then recorded as the stalk diameter.

The above method uses motor torque as an indicator of when both grasper plates are in contact with the plant stalk. The torque requirement of the motor can change when there is a slight compression of the stalk. This means that the diameter measured by this method can be slightly smaller than the actual stalk diameter. Alternatively, the grasping mechanism can be retrofit with pressure plates (i.e. appropriately sized load cells) that are much more sensitive to light force contact with the plant. These pressure plates can provide an indication when the stalk makes initial contact with the plates without compressing it. This results in a more accurate stalk diameter measurement.

Plant Strength

Root pulling force measurement is typically a destructive test. Once the grasping mechanism starts the pulling sequence, it continues upward motion until the plant and all or a portion of the root structure is fully pulled from the ground. Once the plant is pulled from the ground it is no longer viable. An alternative to this method can be used to determine if a plant can withstand a specified pulling force. This is useful to help determine if plants are developing as expected or if there is disease affecting certain plants that reduce the stalk strength or root development.

A nondestructive strength test is very similar to how a normal root pulling force test is performed. The mechanism identifies a plant location and move into position to pull. The grasping mechanism closes on the plant stalk and start to apply upward force using the Z actuator. Instead of continuing an upward pull until the plant is removed from the ground, however, the Z actuator pulls upward until a preset force is measured. If the plant is able to withstand this force without being pulled from the ground, the test is indicated as a success and the grasping mechanism releases the plant. If instead the minimum force is able to pull the plant from the ground or cause the stalk to break, the tested is recorded as a failure and provides indication that the particular plant or area of the field needs further examination.

Those of ordinary skill in the art will appreciate that the foregoing description of the embodiments are written to the person of ordinary skill in the art, who may make various modifications thereto that are within the scope of the invention as defined by the below and within claims.

Additional Variations of Use

The below list are additional variations of use that the RPF mechanism

Above ground imaging—the RPF mechanism could use the vision based camera system to scan the above ground portion of the plant to identify certain features using its image recognition capabilities such as counting number of ears on a corn plant for example, or the presence of developed above ground roots (John can provide the technical term).

Addition of a stereo camera could provide a 3d image of the root system once it is pulled from the ground.

Similar to root pulling strength, the RPF mechanism could be used to measure buckling strength of the stalk by instead applying a measured downward force until the structure of the stalk fails which would provide information on the strength characteristics of the stalk.

Lodging resistance is measured as the force required to bend a plant until breaking when applied horizontal to the ground at a specified height. Without modification, the RPF mechanism can measure lodging resistance by gripping the plant higher and applying a lateral force.

The RPF mechanism because of its ability to move in all three axial directions, could measure root pulling force at specified angles as opposed to directly upward to determine if this measurement can be correlated to other root characteristics.

The invention claimed is:

1. A device for measuring the root pulling force of a plant, comprising an X-axis actuator, a Y-axis actuator, a Z-axis actuator, and a plant grasping mechanism having plates,
   wherein the X-axis actuator is perpendicular to the plane formed by the Y-axis actuator and the Z-axis actuator,
   wherein the plates of the plant grasping mechanism are oriented approximately parallel to the plane formed by the Y-axis actuator and the Z-axis actuator.

2. The RPF device of claim 1, further comprising a blade attached to the plant grasping mechanism, wherein said blade is capable of cutting a plant stalk.

3. The RPF device of claim 1, further comprising: a three axis load cell.

4. The RPF device of claim 3, wherein the three axis load cell is capable of measuring force along three independent axes.

5. The RPF device of claim 1, wherein said device further comprises a support frame in an inverted U shape, wherein each side of the U shape comprises a leg.

6. The RPF device of claim 5, wherein said frame comprises a landing plate.

7. The RPF device of claim 5, wherein each leg is capable of contacting ground on either side of a plant.

8. The RPF device of claim 1, wherein the at least one actuator provides pulling force to the plant grasping mechanism.

9. The RPF device of claim 8, wherein at least one actuator provides force at a fixed velocity.

10. The RPF device of claim 9, wherein at least one actuator is outfitted with an encoder, wherein said encoder can track a position along its length of travel.

* * * * *